United States Patent
Yokoshi et al.

(10) Patent No.: US 7,340,215 B2
(45) Date of Patent: Mar. 4, 2008

(54) COMMUNICATION SYSTEM, COMMUNICATION TERMINAL APPARATUS AND WIRELESS KEY APPARATUS

(75) Inventors: Minoru Yokoshi, Tokyo (JP); Mitsuyoshi Yasuda, Tokyo (JP); Katsutoshi Itoh, Tokyo (JP); Makoto Natori, Saitama (JP); Osamu Yoshimura, Kanagawa (JP); Takeshi Itagaki, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 0 days.

(21) Appl. No.: 11/170,939

(22) Filed: Jun. 30, 2005

(65) Prior Publication Data

US 2006/0035624 A1   Feb. 16, 2006

(30) Foreign Application Priority Data

Jul. 2, 2004   (JP)   .............................. 2004-197373

(51) Int. Cl.
*H04B 7/00*   (2006.01)
(52) U.S. Cl. ....................... 455/41.2; 455/410; 370/252
(58) Field of Classification Search ................ 455/410, 455/412, 41.2, 411; 370/252, 253
See application file for complete search history.

(56) References Cited

U.S. PATENT DOCUMENTS 7,005,963 B1* 2/2006 Scalisi et al. ................ 340/7.1

2003/0143971 A1* 7/2003 Hongo et al. ................ 455/313
2005/0170848 A1* 8/2005 Sato et al. ............... 455/456.3
2005/0242921 A1* 11/2005 Zimmerman et al. ........ 340/5.2
2006/0189334 A1* 8/2006 Wakabayashi .............. 455/500

* cited by examiner

Primary Examiner—Joseph Feild
Assistant Examiner—Inder Pal Mehra
(74) Attorney, Agent, or Firm—Frommer Lawrence & Haug LLP; William S. Frommer; Thomas F. Presson

(57) ABSTRACT

It was constituted such that in a case when a function of the communication terminal apparatus 10 is limited in response to a wireless communication state between the communication terminal apparatus 10 and the wireless key apparatus 50, it is controlled in the wireless key apparatus 50 such that a communication connection with the communication terminal apparatus 10 is to be carried out; the function of the terminal apparatus 10 is to limited in the communication terminal apparatus 10 in a case when a predetermined communication state cannot be maintained with respect to the wireless key apparatus 50 and at the same time; and in a case when it is detected that the terminal apparatus 10 exists in a predetermined region such as in the vicinity of the apparatus 10 or the like, the function of the terminal apparatus 10 is not to be limited regardless of the communication state with respect to the wireless key apparatus 50. In this manner, low power consumption can be attempted in a case when a security process of a communication terminal apparatus such as a mobile telephone terminal is carried out by a wireless communication.

13 Claims, 21 Drawing Sheets

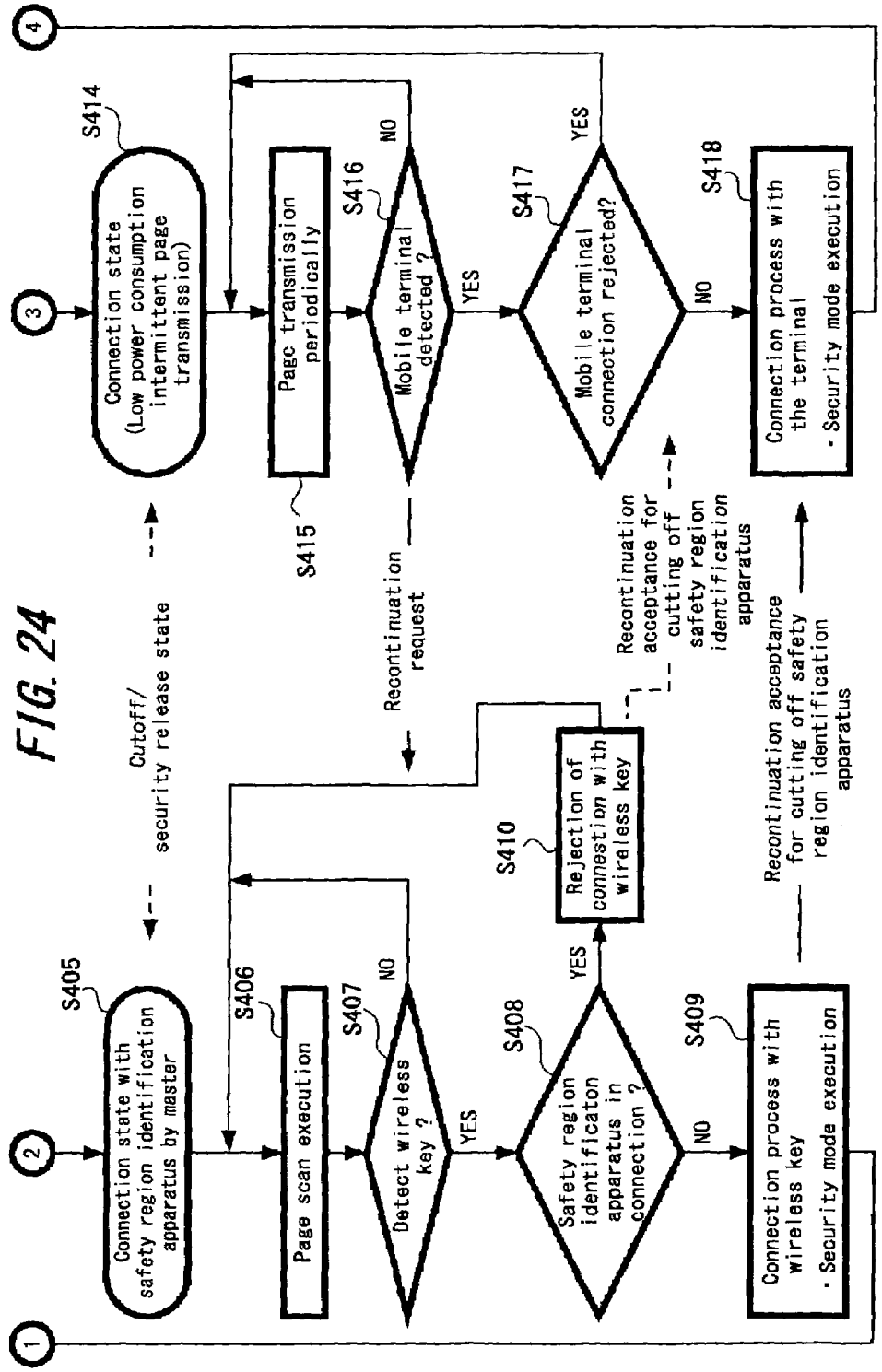

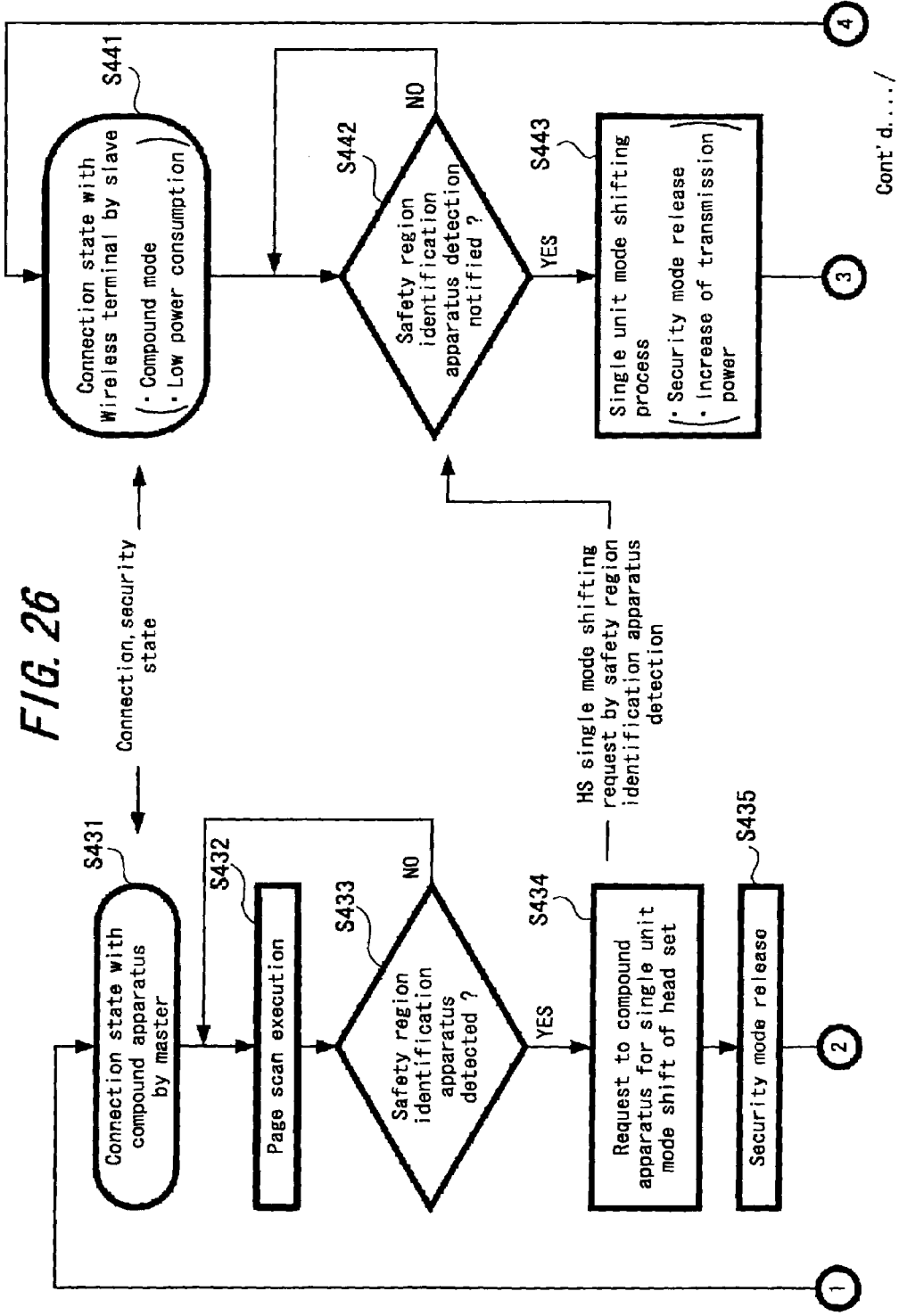

COMMUNICATION SYSTEM, COMMUNICATION TERMINAL APPARATUS AND WIRELESS KEY APPARATUS

CROSS REFERENCES TO RELATED APPLICATIONS

The present invention contains subject matter related to Japanese Patent Application JP 2004-197373 filed in the Japanese Patent Office on Jul. 2, 2004, the entire contents of which being incorporated herein by reference.

BACKGROUND OF THE INVENTION

1. Field of the Invention

The present invention relates, for example, to a communication system suitable for being applied to an apparatus constituted by a communication terminal apparatus such as a mobile telephone terminal and a wireless key apparatus restricting the operation of the communication terminal apparatus and to a communication terminal apparatus and a wireless key apparatus constituting the communication system.

2. Description of the Related Art

In recent years, a mobile telephone terminal which is one of communication terminal apparatuses a user always taking along in possession has a trend such that various functions other than wireless telephone functions of primary functions are built-in so as to contain multi functions.

For example, there exists such a terminal in which a camera function carrying out a filming of a still picture and a moving picture, a recording and reproducing function of music data, a viewing and listening function of television broadcast or the like is built-in.

In addition, there has been developed a mobile telephone terminal in which a function as a non-contacting IC card which has been prevailing rapidly in recent years is built-in. This non-contacting IC card is utilized as a boarding ticket of transport facilities, a membership card, an employee ID card, a card for price settlement means at a shop or the like where an authentication process is carried out by performing wireless communication between adjacent reader and writer, so that it is easy-to-use as compared with a magnetic card or the like. It should be noted in a case when an IC card function unit is mounted in a mobile terminal that the IC card function unit is not always necessarily to have a card type shape.

And now, it is preferable for the mobile telephone terminal having multi functions in this manner to be carried out with a process in order to secure some kind or another security for preventing various functions provided in the terminal from being abused when the terminal is lost. In particular, in case of a terminal installed with an IC card function unit, there is a possibility that personal information stored as the IC card function is read out unjustly or unjust settlement or the like utilizing the IC card function is carried out, so that the necessity for a function for preventing the unjust use thereof is high. There are descriptions, for example, in patent documents 1 and 2 that a wireless card which forms a pair with respect to the mobile telephone terminal is prepared and authentication request is wireless-transmitted periodically from that wireless card such that the functions of mobile telephone terminal is made to be restricted in a case when collation with respect to the authentication request cannot be taken.

[Patent Document 1] Jap. laid-open patent publication No. 2001-352579

[patent document 2] Jap. laid-open patent publication No. 2001-358827

However, if it is attempted to provide in a mobile telephone terminal with a communication circuit for carrying out an exclusive authentication process or authentication processing means for carrying out function limitation of that terminal such as shown in the descriptions in the patent documents 1 and 2, there is a problem that the constitution of the terminal becomes complicated. In case of carrying out such a wireless communication for the function limitation, if various wireless communication systems existing in the related art can be applied as they are, it is to contribute to lowering the cost of a mobile terminal.

However, in a case when it is considered to use various wireless communication systems existing in the related art as they are for the purpose of security assuring, a case is supposed in which the function limitation does not always function effectively. More specifically, it is fundamental for a commonly used wireless communication system to carry out a wireless communication with a terminal of a partner as favorably as possible within the specification given by the wireless system. Consequently, for example, a wireless card for carrying out function limitation of a mobile telephone terminal and its terminal is prepared and even if a system is composed assuming that the function of the mobile telephone terminal is made to be limited in a case when the distance between the both sides becomes apart equal or more than around several meters, it is practically difficult to define one-sidedly a distance which makes the wireless communication possible between the mobile telephone terminal and the wireless card such that it is supposed that there were various problems for making it practicable. More specifically, in case of a favorable communication environment, the function limitation is made effective after a quite far distance and in case of an inferior communication environment on the contrary, the wireless communication cannot be carried out even if the mobile telephone terminal and the wireless card are adjacent and the function limitation is made effective.

Also, it is preferable for an apparatus such as a wireless card or the like which is used as a pair with a mobile telephone terminal not to take a lot of trouble as much as possible for everyday use, but practically, relatively a large power consumption occurs when it always exchanges data for authentication or the like with a mobile telephone terminal, so that it is frequently necessary to exchange or charge a battery and there was a problem that it took a lot of trouble for functioning it as an authentication apparatus.

SUMMARY OF THE INVENTION

The present invention was invented in view of aforesaid matters and has recognized that a low power consumption can be attempted in a case when a security process of a communication terminal apparatus such as a mobile telephone terminal is carried out by a wireless communication.

It is constituted in the present invention such that in case of limiting the function of the communication terminal apparatus in response to the communication state between the communication terminal apparatus and the wireless key apparatus, it is controlled in the wireless key apparatus so as to communication-connect with the communication terminal apparatus; in a case when a predetermined communication state cannot be maintained in the communication terminal apparatus with respect to the wireless key apparatus, the function of aforesaid terminal apparatus is to be limited; and in a case when aforesaid terminal apparatus detects a predetermined region, the function of aforesaid terminal apparatus is not be limited regardless of the communication state with the wireless key apparatus.

By constituting in such a manner, it becomes possible to assure the security without carrying out a wireless communication with the wireless key apparatus in a case when it is detected that the communication terminal apparatus exists in a predetermined region.

According to the present invention, it becomes possible to assure the security without carrying out a wireless communication with the wireless key apparatus in a case when it is detected that the communication terminal apparatus exists in a predetermined region and a wireless communication with the wireless key apparatus for assuring the security is not necessary in a state in which the communication terminal apparatus exists within a predetermined region, so that it is possible to attempt for making the communication terminal apparatus or the wireless key apparatus in lower power consumption that much.

In this case, in a case when it is detected that it is in a predetermined region, a process required for maintaining the wireless communication connection becomes unnecessary by cutting off the wireless connection between the communication terminal apparatus and the wireless key apparatus, so that the load of the communication control becomes less that much and lowering of the power consumption can be attempted.

Also, in a case when the wireless connection is cut off, it is possible by carrying out a process for reconnecting the cut off wireless connection periodically to carry out a process speedily in a case when it goes away from a predetermined region and security assuring by the wireless key apparatus becomes necessary.

Also, it was constituted in the communication terminal apparatus such that the detection that it is within a predetermined region is performed by detecting that it is wireless-connected with an apparatus which was registered by the communication means in aforesaid terminal apparatus beforehand, so that the range capable of communicating with that registered apparatus is to be set as a region in which the security assuring by the wireless key apparatus is not necessary and, for example, by registering a home apparatus or the like, the security operation by the wireless key apparatus comes to be carried out only in a case when the communication terminal apparatus is brought out of home.

Also, it was constituted for the detection that it is within a predetermined region with respect to the communication terminal apparatus such that the absolute position of aforesaid terminal apparatus is to be detected, so that, for example, by registering the home position, the security operation by the wireless key apparatus comes to be carried out only in a case when the communication terminal apparatus is brought out of home.

Also, with respect to the wireless key apparatus, another function for realizing a function other than limiting the function of the communication terminal apparatus is provided with and it becomes possible to carry out a wireless communication for another function favorably by setting the communication in the communication means to a communication state for another function in a state in which the communication terminal apparatus does not need the security assuring by the wireless key apparatus.

DESCRIPTION OF THE PREFERRED EMBODIMENTS

Hereinafter, one exemplified embodiment of the present invention will be explained with reference to the attached drawings.

In the present invention, a wireless key apparatus carrying out a wireless communication with a mobile telephone terminal apparatus is prepared and it is constituted such that security lock of the mobile telephone terminal apparatus is to be carried out according to a wireless communication state of the both sides. It will be explained with respect to process constitutions and operations which become features of the present invention in detail with reference to FIG. 20 and subsequent drawings, wherein first, it will be explained with respect to the constitutions and the processes of a mobile telephone terminal apparatus and a wireless key apparatus which become a premise on an occasion when the security process according to the present invention is carried out with reference to FIGS. 1 to 19.

Figure 1:
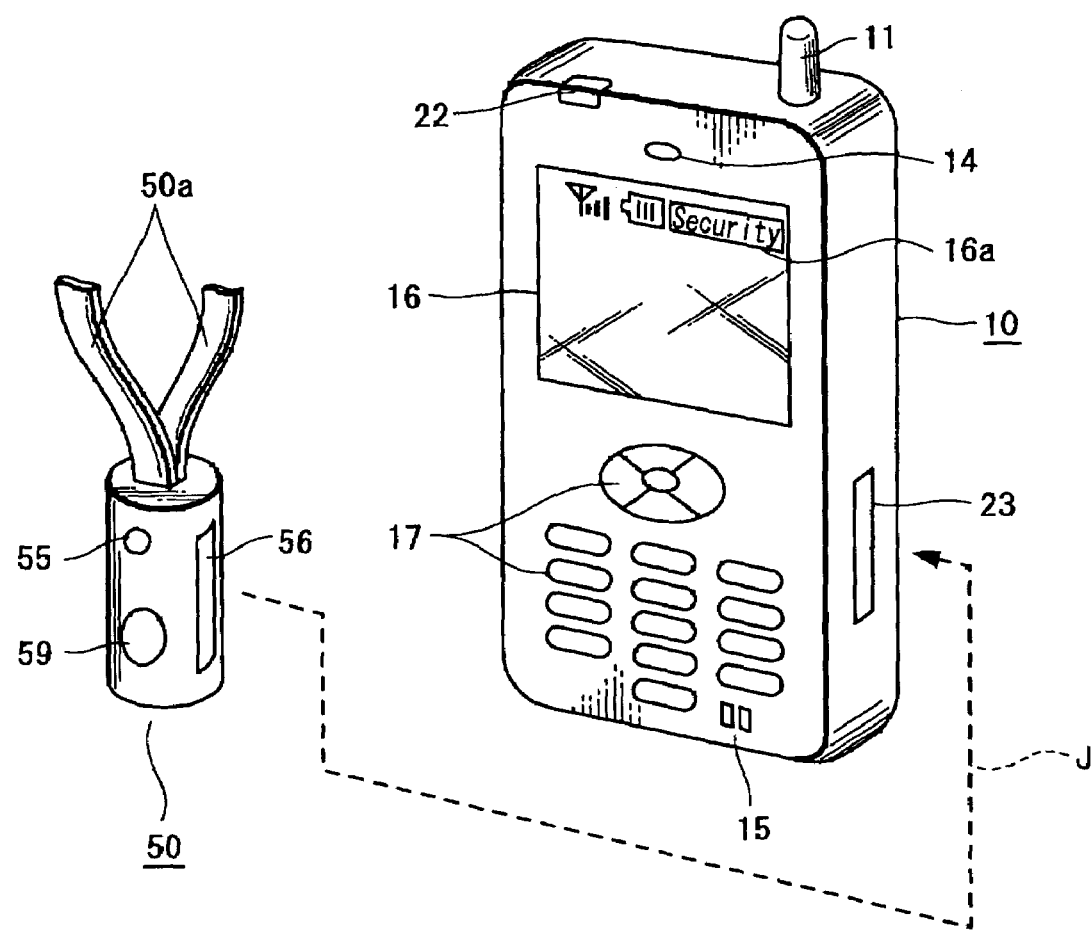
FIG. 1 is a perspective view showing a system constitutional example according to one exemplified embodiment of the present invention.

FIG. 1 is a diagram showing an example of an apparatus of the present invention. Here, a wireless key apparatus 50 is prepared as a separate body with a mobile telephone terminal apparatus 10. According to this example, the wireless key apparatus 50 is constituted in a smaller size as compared with the mobile telephone terminal apparatus 10 and, for example, it is constituted such that it is hung around the neck of a user by a neck strap 50a or the like and is made to be a small sized shape which a user can always wear. The wireless key apparatus 50 is arranged with a light emitting unit 55 and an operation unit 59 (constituted in FIG. 1 such that they are push button shaped). It is also constituted such that a terminal unit 56 for connecting with the mobile telephone terminal apparatus 10 is prepared.

As a mobile telephone terminal apparatus 10, there is shown here an example of a general mobile telephone terminal. In the mobile telephone terminal apparatus 10, there are arranged an antenna 11 for a wireless telephone communication, a speaker 14, a microphone 15, a display unit 16, an operation unit (operation key) 17, a light emitting unit 22 and the like. Also, a terminal unit 23 for connecting with the wireless key apparatus 50 is prepared. This terminal unit 23 may be used as an existing terminal which is prepared for the mobile telephone terminal apparatus 10 to be connected with a charger or various external apparatuses. Also, it may be constituted in the display unit 16 such, for example, that a security display 16a showing that it is in an operation under a state that security is assured as explained hereinafter and a display (not shown) showing a fact that a so-called security lock in which the operation is limited according to its security function is executed may be carried out.

Figure 2:
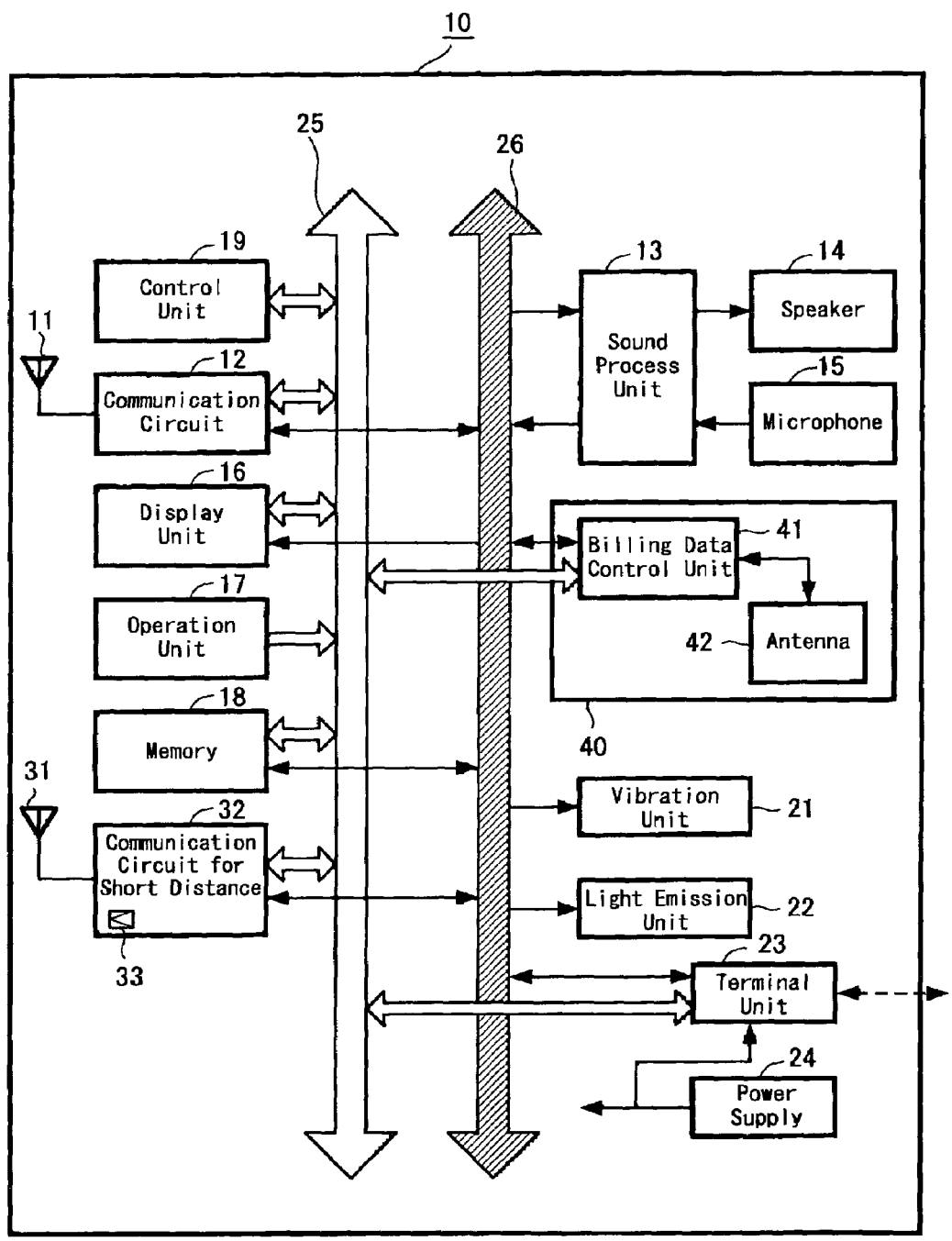
FIG. 2 is a block diagram showing a constitutional example of a communication terminal apparatus according to one exemplified embodiment of the present invention.

Next, a constitutional example of the mobile telephone terminal apparatus 10 of the present invention will be explained with reference to FIG. 2. The mobile telephone terminal apparatus 10 of the present invention is provided with an antenna 11 for a wireless telephone communication for carrying out a wireless communication with a base station for a wireless telephone. The antenna 11 is connected to a communication circuit 12 for a wireless telephone communication so as to carry out a wireless communication with the base station under a control of a control unit 19. When a communication for a telephone call is carried out in the communication circuit 12, received sound data are supplied to a sound data processing unit 13 so as to perform a receiving process of the sound data and thereafter, they are supplied to a speaker 14 to be outputted and also, sound data for transmission which are picked up by a microphone 15 and processed in the sound data processing unit 13 are supplied to the communication circuit 12 to be transmitted.

The mobile telephone terminal apparatus 10 is provided with a display unit 16 constituted by a liquid crystal display or the like and an operation unit 17 constituted by operation keys or the like. It is possible to display a mail sentence, a picture screen accessed to the web or the like on the display unit 16 an input operation of a telephone number, a mail sentence or the like and various mode settings or the like can be carried out by an operation unit 17. Here, it is constituted such that a communication process is carried out in a communication circuit 32 for short distance which will be described later on and in a case when its communication state is in a connection mode in which a connection process with a communication partner is carried out and when the control unit 19 detects that any one of the keys constituting the operation unit 17 or the like was operated, a process for transmitting a signal (page signal) compulsorily asking for a response with respect to the partner. This concrete process example will be described later on.

The respective blocks in the terminal apparatus 10 are connected with the control unit 19 or the like by way of a control line 25. Also, each block is constituted such that data transfer can be carried out by way of a data line 26 so as to store necessary data in a memory 18. In the memory 18, not only data necessary as a mobile telephone terminal are stored but also it is possible to store data necessary in an IC card function unit 40 which will be described later on. Also, a necessary data saving for executing a program and/or for realizing the security function thereof can be carried out in the memory 18.

Also, the mobile terminal apparatus 10 is provided with a vibration unit 21 constituted by a vibration motor or the like which vibrates the terminal itself for carrying out notification of receiving signal by way of the telephone line to this terminal apparatus 10 and various warnings and a light emitting unit 22 constituted by a light emitting diode or the like. Then, the vibration and the light emission are carried out under a control of the control unit 19. These vibration unit 21 and light emitting unit 22 are used as notification means for notifying receiving signal or the like for the mobile telephone terminal and they are used also for necessary warning means as a security function. It should be noted that it is possible to output warning sound from the speaker 14 or the like in a case when sound is to ring as necessary warning means in the security function.

Then, the mobile telephone terminal 10 of the present invention is provided with a communication circuit 32 for short distance wireless communication in addition to the communication circuit 12 for telephone communication. Then, it is carried out by using this communication circuit 32 a wireless communication with a partner within a relatively narrow region of, for example, around from several meters to hundred meters at the maximum by way of a connected antenna 31 (however, it is constituted such that a process for narrowing the communication possible region is to be executed when carrying out a communication during a normal period with the wireless key apparatus as will be described later on). Here, for example, a wireless communication system for short distance referred to as Bluetooth® is applied. In this short distance wireless communication, various kinds of use applications are supposed such, for example, that a communication is carried out with a head set for a hands-free telephone call or a communication with a personal computer apparatus is carried out through the mobile telephone terminal apparatus 10. As to the frequency band used for the wireless communication, for example, 2 GHz band is used, it is constituted such that a frequency band or modulation system which does not intervene in the wireless telephone communication in the communication circuit 12 is employed. According to this constitution, it is possible to carry out the wireless telephone communication in the communication circuit 12 and the communication in the communication circuit 32 for short distance wireless communication at the same time.

In case of this example, a wireless communication is carried out with a wireless key apparatus 50 by using this communication circuit 32 for short distance communication. However, a wireless communication is possible also with an apparatus (head set, personal computer apparatus or the like) other than the wireless key apparatus 50 if it is a communication apparatus of the same communication system. Also, in a case when a security function is executed, the wireless key apparatus 50 carrying out a wireless communication by the communication circuit 32 is to be limited to a specific one apparatus. For that purpose, for example, identification ID or the like of the apparatus is to be registered in the memory 18 or the like beforehand. With respect to registered information relating to this wireless key apparatus 50, it may be constituted such that a user cannot revise it. Also, it is constituted in case of the present invention such that a process for the security assuring is to be carried out also in a case when a specific wireless communication apparatus other than a wireless apparatus constituted by a wireless key apparatus is detected by a wireless communication in the communication circuit 32. It will be described later on with respect to process examples in a case when the specific wireless communication apparatus other than the wireless apparatus is detected (examples after FIG. 20).

A transmission amplifier 33 which amplifies the transmission signal in the communication circuit 32 is constituted such that transmission power is to be set in a plurality of steps by the control of the control unit 19 or the like. Also, in a state in which it is wireless-connected with the wireless key apparatus 50, it is constituted such that low transmission power among the plurality of steps is to be set. Further, in a state in which it is connected with an apparatus other than the wireless key apparatus 50, transmission power of a relatively high step is to be set. It should be noted in a case when it is wireless-connected with an apparatus installed a function for a wireless key apparatus such as a head set which will be described later on that the transmission power is to be set depending on the operation state of the partner apparatus at that time (more specifically, depending on whether or not it is operated only as a wireless key apparatus or whether or not combined another function is operated). It will be described later on with respect to a concrete process example for setting the transmission power.

The mobile telephone terminal 10 of the present invention is provided with a non-contacting IC card function unit 40. The non-contacting IC card function unit 40 includes a billing data control unit 41 to which an antenna 42 is connected and an adjacent wireless communication in a very adjacent distance of around several centimeters is carried out with reader and writer. In this adjacent wireless communication, it is possible to operate the billing data control unit 41 by means of the power obtained by receiving a radio wave from the reader and writer side, but according to this example, it is constituted such that the billing data control unit 41 is to be operated by the power supply supplied from a power supply circuit 24 in the mobile telephone terminal 10.

When the IC card function is executed, the billing data control unit 41 reads out data necessary for billing or authentication from the memory 18 (or a memory in the billing data control unit 41 (not shown)) and an exchange of the read out data is carried out with the reader and writer by an adjacent wireless communication. For example, in a case when it is functioned as a boarding ticket of transport facilities, it is constituted such that the billing data control unit 41 transmits data charged amount of money or the like which is possible to be paid by direct debit for an effective zone and an effective period as a boarding ticket (commutation ticket) or as a boarding ticket or personal information or the like relating to a person possessing this terminal (IC card) to the reader and writer so as to carry out a billing process or an authentication process. In case of using an employee ID card, a membership card, a card for price settlement, a credit card or the like, necessary information for its authentication is also exchanged.

Further, it is constituted such that the mobile telephone terminal apparatus 10 of the present invention is provided with a terminal unit 23 and various peripheral apparatuses, data process apparatuses which are not shown or the like can be connected directly thereto by way of this terminal 23. In this case, it is constituted such that power supply can be applied to external apparatuses connected by means of the terminal unit 23 from the power supply circuit 24 installed with a secondary battery or the like which applies power supply to respective portions in the mobile telephone terminal apparatus 10. For example, as shown by an arrow J of a dotted line in FIG. 1, it is constituted in a case when the terminal unit 56 of the wireless key apparatus 50 and the terminal unit 23 of this mobile telephone terminal apparatus 10 are connected directly such that it is possible to supply power to a secondary battery in the wireless key apparatus 50 from the power supply circuit 24 in the mobile telephone terminal apparatus 10 so as to charge it. Also, it is constituted in a case when the wireless key apparatus 50 is connected directly to the terminal unit 23 of the mobile telephone terminal apparatus 10 such that the control unit 19 of the mobile telephone terminal apparatus 10 detects that fact and a security process when directly connected (for example, security process executed without short distance wireless communication which will be described later on) is to be carried out.

Figure 3:
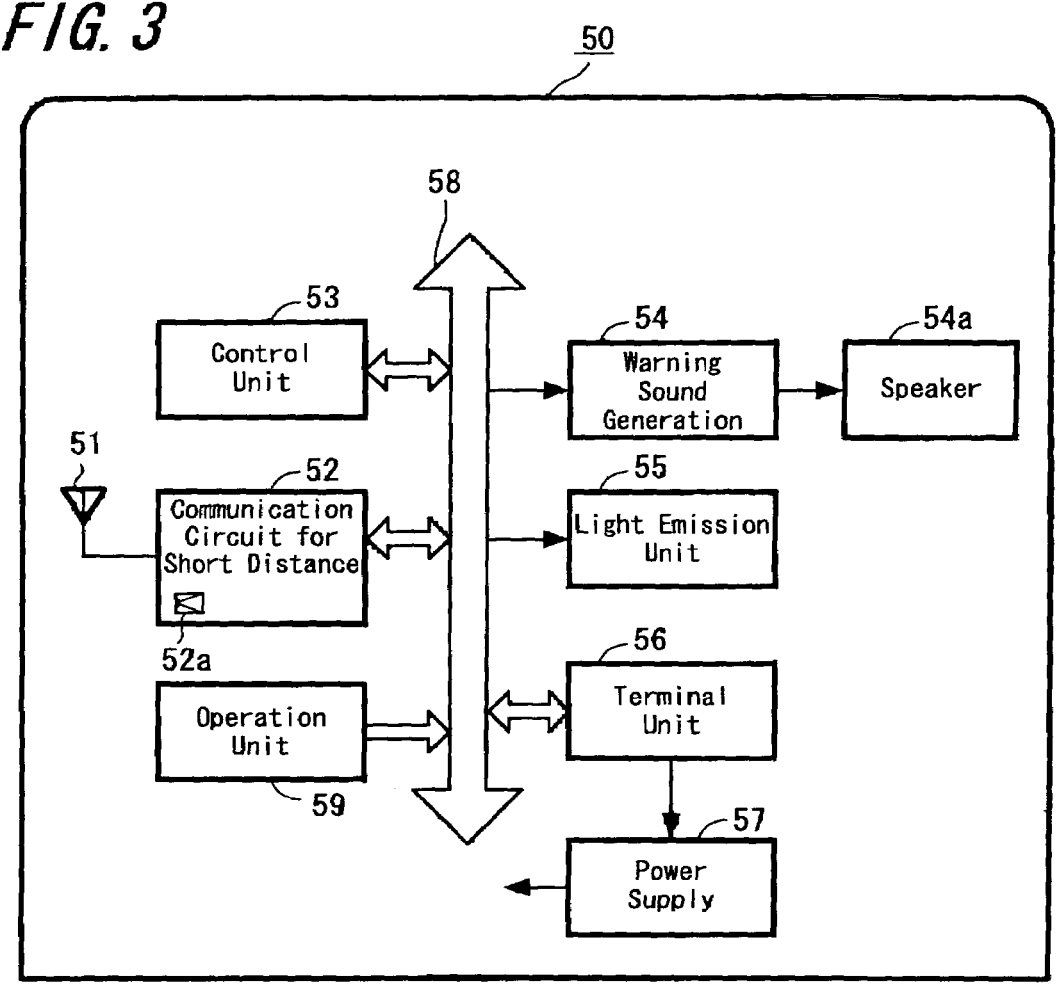
FIG. 3 is a block diagram showing a constitutional example of a wireless key apparatus according to one exemplified embodiment of the present invention.

Next, it will be explained with respect to the constitution of the wireless key apparatus 50 which carries out a wireless communication with the mobile telephone terminal apparatus 10 according to the present invention with reference to FIG. 3. The wireless key apparatus 50 of the present invention is provided with a communication circuit 52 for short distance wireless communication. Then, by using this communication circuit 52, a wireless communication is carried out with a partner in a relatively narrow region of, for example, around several meters and at the maximum hundred meters by way of a connected antenna 51 (however, it is constituted when communication is carried out normally with the mobile telephone terminal apparatus 10 such that a process for narrowing the communication possible region is executed). Here, it is constituted such that Bluetooth system which is a short distance wireless communication system provided on the mobile telephone terminal apparatus 10 side is also applied to the wireless key apparatus 50. The partner carrying out a wireless communication by the communication circuit 52 is limited to a specific one of the mobile telephone terminal apparatus 10. For that purpose, for example, the identification ID or the like of its apparatus was registered beforehand. With respect to the registered information as to the mobile telephone terminal apparatus 10, it may be constituted such that a user cannot revise it.

With respect to the wireless communication in the communication circuit 52, it is executed under a control of a control unit 53. In this case, it is constituted such that transmission power is to be set in a plurality of steps in a transmission amplifier 52*a* which amplifies a transmission signal in the communication circuit 52 under a control of the control unit 53 or the like. Also, in a state where it is wireless-connected with the mobile telephone terminal apparatus 10, a low transmission power is to be set in the plurality of steps. However, it is constituted in a case when the control unit 53 detects that an operation unit 59 (button shaped operation unit or the like as shown in FIG. 1) arranged in the wireless key apparatus 50 is operated such that the transmission power temporarily in the transmission amplifier 52*a* is heightened and a transmission process of a signal (page signal or the like) for making the partner recognize compulsorily is to be carried out.

The wireless key apparatus 50 of this example is provided with a warning sound creation unit 54 connected with a speaker 54*a* for outputting warning sound and a light emitting unit 55 constituted by a light emitting diode or the like. Then, output of the warning sound, vibration and light emission are carried out under the control of the control unit 53. These warning sound creation unit 54 and light emitting unit 55 are used as warning means necessary for security function. Also, it is constituted such that the light emitting unit 55 functions also as display means which displays the security mode at present in a state where a wireless communication is carried out with the mobile telephone terminal apparatus 10 and the security function is operated. Specifically, for example, the light emitting unit 55 functions also as display means for displaying a security mode by changing the display such that when the light emitting unit 55 is blinking in green, it indicates that it is in a normal mode and when it is blinking in red, it indicates that it is in a warning mode, when there is no display at all, it indicates that it is in a function limitation mode, or the like. The display means for displaying the security mode may be constituted such that a liquid crystal display or the like is used and a display where modes can be recognized directly by characters and figures or the like is carried out. Also, it may be constituted as warning means for warning by vibration.

It is constituted such that the control unit 53 and each unit is connected by means of a control line 58 and a wireless communication in the communication circuit 52, operations in the warning sound creation unit 54 and the light emitting unit 55 and the like are executed under a control of the control unit 53.

Also, it is constituted such that the wireless key apparatus 50 of the present invention is provided with a terminal unit 56 and the mobile telephone terminal apparatus 10 can be connected directly by using this terminal 56. When connected thereof, the control unit 53 in the wireless key apparatus 50 carries out a data transfer directly with the control unit 19 in the mobile telephone terminal apparatus 10 and carries out a security process when directly connected without carrying out a short distance wireless communication. Also, in a case when remaining charge amount of the secondary battery installed in a power supply circuit 57 in the wireless key apparatus 50 is small, it is possible to charge the secondary battery in the power supply circuit 57 by a charge current supplied from the side of the mobile telephone terminal apparatus 10.

Figure 4:
FIG. 4 is an explanatory diagram showing a usage example according to one exemplified embodiment of the present invention.

When the mobile telephone terminal apparatus 10 and the wireless key apparatus 50 constituted in this manner are used, a user always carries the wireless key apparatus 50 as shown, for example, in FIG. 4. Then, it is constituted such that when the user uses the mobile telephone terminal apparatus 10, the function is not to be limited (normal mode which will be described later on). Then, in a case when a user goes away from the mobile telephone terminal apparatus 10 by a distance of a certain degree after putting the mobile telephone terminal apparatus 10 somewhere in a state where the wireless key apparatus 50 is always maintained to be carried, a warning operation is executed from the wireless key apparatus 50 (warning mode which will be described later on). If he stays away from the mobile telephone terminal apparatus 10 in a state where the warning operation is executed, it becomes a state where the function of the mobile telephone terminal apparatus 10 is limited (function limitation mode which will be described later on). It should be noted with respect to the warning operation in a warning mode that it may be constituted such that it is to be carried out only on the side of the mobile telephone terminal apparatus 10. Alternatively, it may be constituted such that the warning operation in the warning mode is to be carried out in both of the wireless key apparatus 50 and the mobile telephone terminal apparatus 10.

With respect to a function of the mobile telephone terminal apparatus 10 which is limited in a function limitation mode, it is a choice, for example, to direct to all of the functions of the mobile telephone terminal apparatus 10 (however, communication function related to security function is not to be limited) and it is another choice to direct to a partial function within the function which the terminal apparatus 10 is provided with. Specifically, it may be constituted, for example, such that only the process using the non-contacting IC card function unit 40 is to be limited. Also, it may be constituted such that address book inspection of the mobile telephone terminal apparatus 10, display of personal information of mail inspection or the like is to be limited. Also, it may be constituted such that only the reception of a signal can be allowed while the transmission as a wireless telephone is to be limited. Also, it may be constituted such that only the reception of a signal can be allowed while the transmission as a wireless telephone is to be limited. In this case, it may be constituted such that only the telephone number for emergency announcement to a police station or the like can be transmitted. Also, it may be constituted such that a process using the non-contacting IC card function unit 40 is not to be limited while only the function as a wireless telephone apparatus is to be limited.

The wireless key apparatus 50 explained so far was constituted as an apparatus for exclusive use which carries out only the security function, but it should be noted that it may be constituted such that it is to be mounted on an apparatus having other function. For example, it may be constituted such that a wireless key apparatus is to be mounted on a head set for carrying out a wireless communication of Bluetooth system with the mobile telephone terminal apparatus 10 and carrying out a so-called hands-free telephone call.

Figure 5:
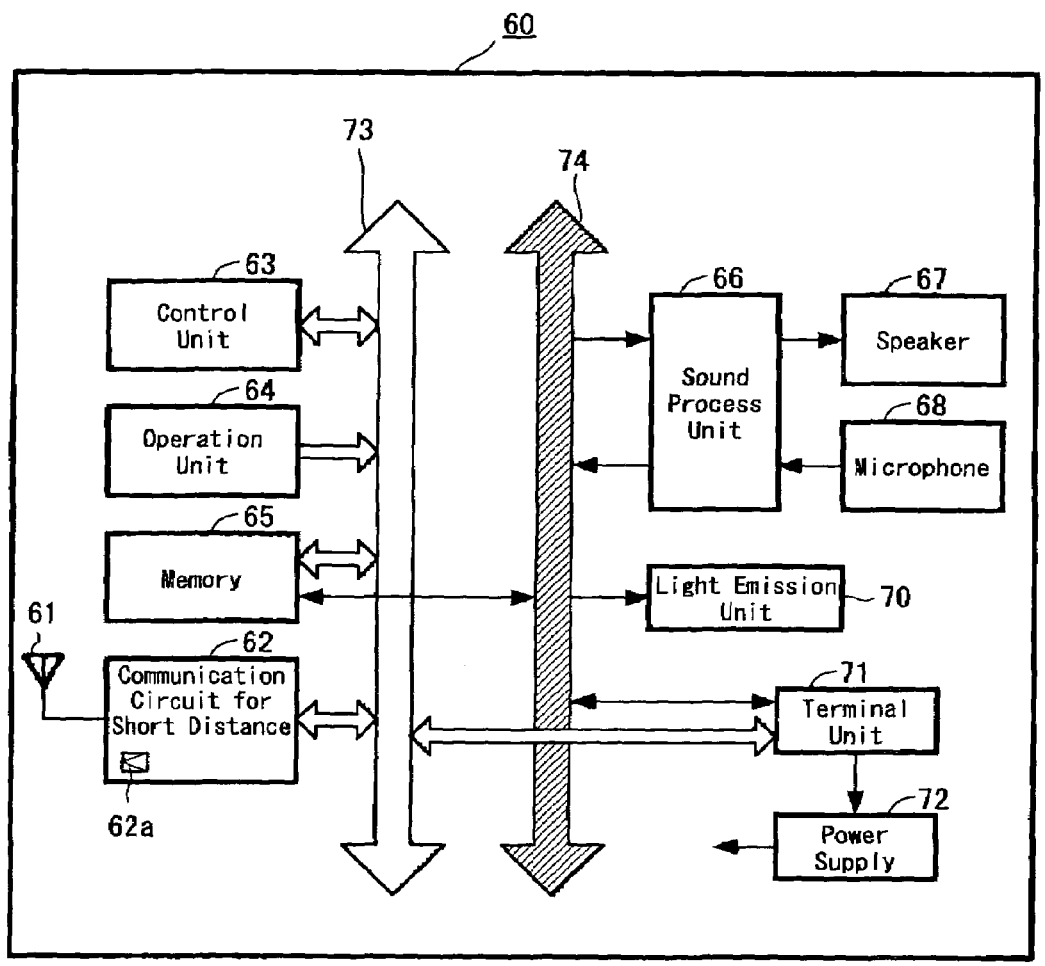
FIG. 5 is a block diagram showing a modified example of a wireless key apparatus (example integrated with head set) according to one exemplified embodiment of the present invention.

FIG. 5 is a diagram showing a constitutional example of a head set with this wireless key. A head set with a wireless key 60 according to the present invention is provided with a communication circuit 62 for short distance wireless communication. This communication circuit 62 carries out a wireless communication with a partner in a relatively narrow region of, for example, around several meters and at the maximum hundred meters by way of a connection antenna 61. Here, Bluetooth system which is the same system as the short distance wireless communication system provided on the side of the mobile telephone terminal apparatus 10 is applied also to the communication circuit 62 of the head set with the wireless key. The partner carrying out a wireless communication by the communication circuit 62 is limited to the specific one of the mobile telephone terminal apparatus 10 which was registered. For that purpose, for example, identification ID of the apparatus or the like is registered beforehand. However, it may be constituted when using only the head set such that there is no limitation for the partner whom the communication circuit 62 carries out a wireless communication.

With respect to the wireless communication in the communication circuit 62, it is executed under a control of the control unit 63. In this case, it is constituted such that transmission power for the transmission amplifier 62a which amplifies the transmission signal in the communication circuit 62 is to be set under a control of the control unit 63 or the like. In a situation with respect to the transmission power setting in which, for example, a wireless key apparatus alone operates and a wireless connection is performed, it is constituted such that the communication possible range is to be limited to a narrow range by making the transmission power be low. Also, in a situation in which both of the wireless key apparatus and the head set (or head set alone) are operated and a wireless connection is performed, it is constituted such that the communication possible range is made to be set to a comparatively wide range by making the transmission power be high.

When a communication for the head set (more specifically, sound data communication for a telephone call) is carried out in the communication circuit 62, received sound data are supplied to a sound data processing unit 66 and a receiving process of the sound data is performed. Thereafter, they are supplied to a speaker 67 and outputted. Also, sound data picked up by a microphone 68 are processed in the sound data processing unit 66 so as to become sound data for transmission. Then, the sound data for transmission are supplied to the communication circuit 62 and transmitted.

In addition, the head set with the wireless key 60 of the present invention is provided with an operation unit 64 constituted by operation keys or the like, a memory 65 and a light emitting unit 70. The light emitting unit 70 is used as warning means relating to the security function and at the same time used also as display means of operation state on the occasion when it is functioned as a head set. These respective units in the head set 60 can carry out exchange of control data by way of a control line 73. Further, the respective units can carry out exchange of sound data or the like by way of a data line 74.

Also, the head set with the wireless key 60 of the present invention is provided with a terminal unit 71 and it is constituted such that the mobile telephone terminal apparatus 10 can be connected directly by means of this terminal 71. When connected with the mobile telephone terminal apparatus 10 directly, it is constituted such that the control unit 63 in the head set with the wireless key 60 carries out a data transfer directly with the control unit 19 in the mobile telephone terminal apparatus 10 and a direct sound data transfer or a security process is to be carried out without a short distance wireless communication. Also, in a case when remaining charge amount of a secondary battery installed in a power supply circuit 72 in the head set with the wireless key 60 is small, it is possible to charge the secondary battery in the power supply circuit 72 by an power supplied from the side of the mobile telephone terminal apparatus 10.

Figure 6:
FIG. 6 is an explanatory diagram showing a usage example of the example in FIG. 5.

In a case when such a head set with a wireless key 60 is prepared, as shown, for example, in FIG. 6, a user putting on the head set with the wireless key 60 can carry out a so-called hands-free telephone call depending on a fact that the mobile telephone terminal apparatus 10 which remains inside a bag or the like and the head set with the wireless key 60 carries out a wireless communication. Further, with respect to a function as a wireless key apparatus, a warning and a function limitation of the mobile telephone terminal apparatus 10 are executed according to position relationship (distance) between the head set with the wireless key 60 and the mobile telephone terminal apparatus 10. More specifically, in a case when the mobile telephone terminal apparatus 10 goes away from the head set with the wireless key 60 to a certain degree of distance, the head set with the wireless key 60 or the mobile telephone terminal apparatus 10 (alternatively, both sides) carries out a warning operation (warning mode which will be described later on). Then, if the user stays away from the mobile telephone terminal apparatus 10 in the state in which this warning operation was carried out, it becomes a state in which the function of the mobile telephone terminal apparatus 10 is limited (function limitation mode will be described later on).

Next, it will be explained with respect to a process example in a case when a security process is carried out by preparing the mobile telephone terminal apparatus 10 and the wireless key apparatus 50 of such a constitute. It should be noted that also a security process in case of using the head set with the wireless key 60 is basically similar, but it will be explained in the explanation hereinafter on the assumption that the wireless key apparatus 50 is used.

First, it will be explained with reference to FIG. 7 with respect to a security process mode (hereinafter designates as security process mode). It is constituted in case of this example such that there are prepared a normal mode M1 which does not limit the function of the mobile telephone terminal apparatus 10, a warning mode M2 for warning that it gets out of the normal mode caused by a fact that the distance between the mobile telephone terminal apparatus 10 and the wireless key apparatus 50 goes away or the like and a function limitation mode M3 for limiting the function of the mobile telephone terminal apparatus 10 in a case when it does not return to from the warning mode to the normal mode (more specifically, in a case when the distance between the mobile telephone terminal apparatus 10 and the wireless key apparatus 50 remains in a far state).

Figure 7:
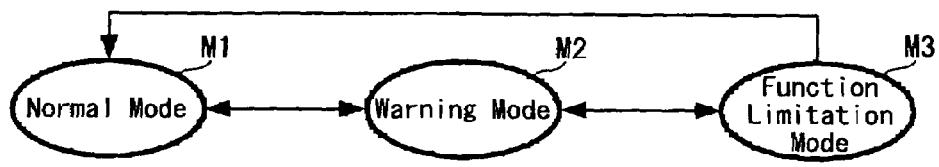
FIG. 7 is an explanatory diagram showing a setting example of a security mode according to one exemplified embodiment of the present invention.

With respect to the transition of these modes, there are, as shown by arrows in FIG. 7, a change from the normal mode M1 to the warning mode M2 and a change from the warning mode M2 to the function limitation mode M3 and further, it returns to the normal mode M1 if the wireless key apparatus 50 approaches the mobile telephone terminal apparatus 10 in a state in which it became the function limitation mode M3. Further, it returns to the normal mode M1 if the wireless key apparatus 50 approaches the mobile telephone terminal apparatus 10 in a state in which it became the warning mode M2 and the warning operation is carried out.

Figure 8:
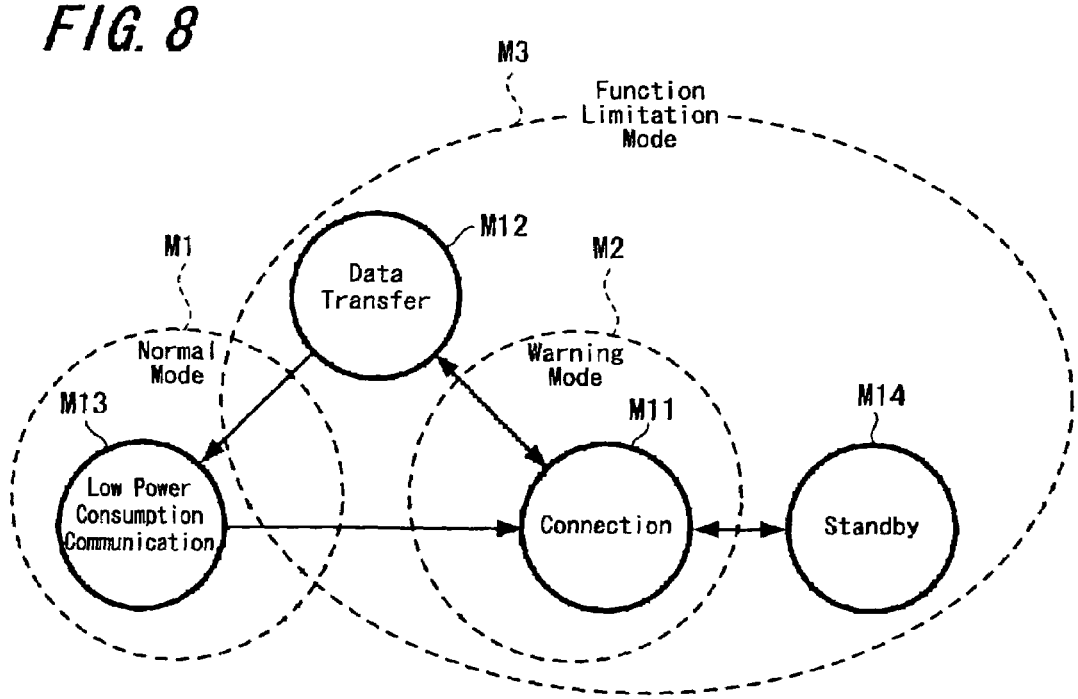
FIG. 8 is an explanatory diagram showing a transition example of a security mode by a communication mode according to one exemplified embodiment of the present invention.

In case of the present invention, these security modes are made to have relation with the communication modes prepared in the Bluetooth system which is a wireless communication system between the mobile telephone terminal apparatus 10 and the wireless key apparatus 50. More specifically, as communication modes in the wireless communication system (Bluetooth system) of this example are shown in FIG. 8, there is a connection mode M11 for authenticating and wireless-connecting the partner apparatus in both of the mobile telephone terminal apparatus 10 and the wireless key apparatus 50 and when authentication is completed mutually and connection is carried out in the connection mode M11, it becomes a data transfer mode M12 in which payload data transfer is carried out practically. When the data transfer is completed in the data transfer mode M12, it is shifted to a low power consumption communication mode M13. In this low power consumption communication mode M13, the wireless communications of both sides are carried out intermittently by a cycle longer than a communication cycle in the data transfer mode M12 and it becomes a state in which the wireless connection between the both sides is maintained. Owing to the fact that the cycle carrying out the intermittent communication is long in this manner, it becomes possible to make the power consumption required for the communication smaller than a case in which it is operated in the data transfer mode M12 and low power consumption is realized. It should be noted that the low power consumption here indicates a phenomenon that the low power consumption is realized by thinning out communication cycles and is not related directly to the process for lowering the transmission power which will be described later on (however, it is constituted as described later on such that a process for lowering transmission power is carried out during a low power consumption mode).

In a case when the data transfer between the both sides is to be restarted in a state of this low power consumption communication mode M13, it returns to the connection mode M11, a process for restarting the communication is carried out in the connection mode M11 and thereafter it becomes the data transfer mode M12 in which the data transfer is carried out practically. In a state in which the wireless connection is maintained in the low power consumption communication mode M13, the connection process in the connection mode M11 is carried out relatively simply and it is possible to carry out the restart of the data transfer rapidly as compared with a case in which the wireless connection is recommenced.

Also, in a case when a connection process with any one of communication partners is not carried out in the connection mode M11 (or in a case when a connection is not possible), each apparatus is shifted to the standby mode M14. The apparatus which becomes this standby mode M14 carries out an intermittent reception or transmission with a very long cycle and carries out a process for searching whether or not a communication apparatus to become a partner exists. Here, it may be constituted such that the apparatus becoming the standby mode M14 does not return to the connection mode M11 if there is no process which may become some kind or another opportunity caused by a user operation or the like. Also, during a period when a communication is carried out between two apparatuses, the two apparatuses are to be set in the same mode basically. More specifically, at least the connection mode M11, the data transfer mode M12 and the low power consumption mode M13 are the modes which shift in synchronism with each other between the two apparatuses.

Here, in case of the present invention, as shown in FIG. 8, the normal mode M1 is set as a security mode when it is a state in which it communicated between the mobile telephone terminal apparatus 10 and the wireless key apparatus 50 in the low power consumption communication mode M13 and a warning mode is started by an opportunity that the communication mode shifts from the low power consumption communication mode M13 to the connection mode M11. The process with respect to the detail in which it is shifted from a warning mode to a function limitation mode will be described later on, but when the security mode becomes the function limitation mode M3, the function limitation mode M3 remains during a period when it is the connection mode M11, the data transfer mode M12 and the standby mode M14. It is constituted only in a case when it is shifted from the data transfer mode M12 to the low power consumption communication mode M13 such that the security mode is to return from the function limitation mode M3 to the normal mode M1.

Figure 9:
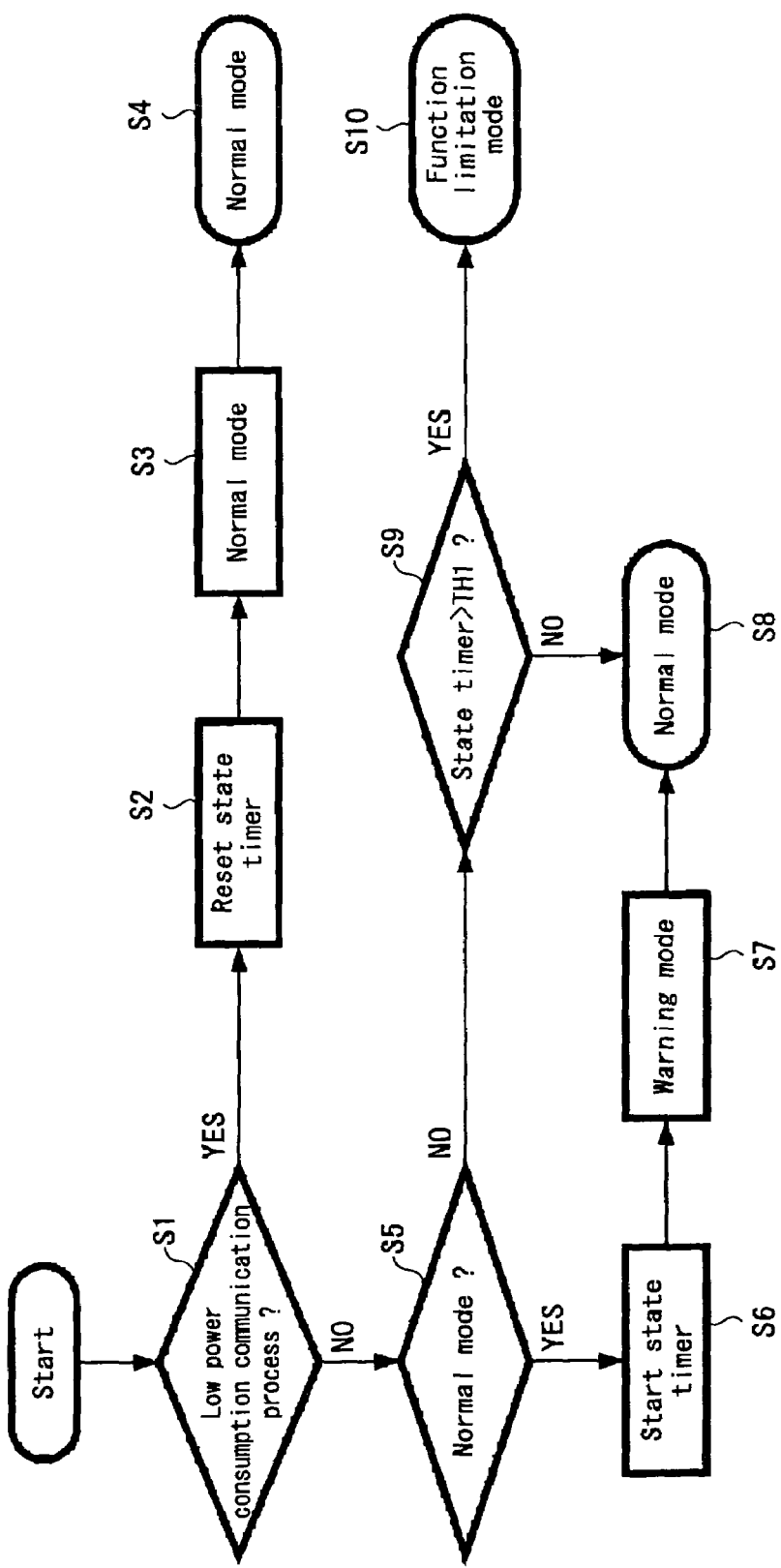
FIG. 9 is a flowchart showing a mode selection process example according to one exemplified embodiment of the present invention.

Next, it will be explained a process in which the security mode is selected in each of the mobile telephone terminal apparatus 10 and the wireless key apparatus 50 with reference to FIG. 9. This security mode selection process is, for example, executed under the control of the control units 19 and 53 of the respective apparatuses.

First, it is judged whether or not the communication mode at present is in a low power consumption communication mode (step S1). Here, in a case when it is in a low power consumption communication mode, a state timer prepared in the control unit is reset (step S2). Then, the security mode is set to a normal mode (step S3) and a process as a normal mode (more specifically, a mode without limiting the function) is executed (step S4). It should be noted that the state timer is a timer counted up by passage of time.

Also, in a case when it is judged in step S1 that it is not in a low power consumption communication mode, it is judged whether or not the security mode just before (at present) is a normal mode (step S5). Here, in case of a normal mode, a state timer prepared in the control unit is made to start (step S6). Then, a start of a warning mode is set (step S7) and a warning operation as a warning mode is executed (step S8). It should be noted that in a case when it is constituted such that only one of the mobile telephone terminal apparatus 10 and the wireless key apparatus 50 carries out the warning operation, any process is not carried out particularly in the other apparatus during the warning mode.

Then, in a case when it is judged in step S5 that the security mode just before (at present) is not a normal mode, it is judged whether or not the counted value of the state timer activated in step S6 exceeds a value TH determined beforehand (step S9). It remains in the warning mode of step S8 until the counted value exceeds the predetermined value TH1 and in a case when the counted value exceeds the predetermined value TH1, it is made to change the security mode to a function limitation mode (step S10). It is designed such that the period when the counted value of the state timer exceeds the predetermined value TH1 after the count is started is a period, for example, of around several seconds to several ten seconds.

Next, it will be explained with reference to the drawings of FIG. 10 and subsequent thereto about a specific example of a communication state in each communication mode in each of the mobile telephone terminal apparatus 10 and the wireless key apparatus 50. First, it will be explained an example in which the mobile telephone terminal apparatus 10 and the wireless key apparatus 50 carry out the authentication process of a partner in the connection mode M11. In case of carrying out a wireless communication by Bluetooth system, one of the communication apparatus of the two apparatuses carrying out the communication becomes a master apparatus and the other communication apparatus becomes a slave apparatus. For the Bluetooth system, either one of the apparatuses may become a master or a slave, but in case of the present invention, it is to be set such that the wireless key apparatus 50 becomes a master and the mobile telephone terminal apparatus 10 becomes a slave.

The apparatus which became a slave (mobile telephone terminal apparatus 10 here) carries out a scan process for searching the master in a connection mode. FIG. 10 is a flowchart showing an operation example in this scan process. In the scan process, continuous reception is carried out for a constant period and a process for searching a signal from the master is carried out (step S11). It is judged in its scan process whether or not a signal (page signal) added with an ID number of the wireless key apparatus 50 which is a partner carrying out the security process was received (step S12). Here, in a case when signal added with the ID number of the wireless key apparatus 50 is not received, it is shifted to an idle process so as to wait for a constant period (step S13) and thereafter it returned to step S11 such that the scan process is repeated.

Then, in a case when it is judged in step S12 that the page signal added with the ID number of the wireless key apparatus 50 was received, a response signal with respect to that page signal is transmitted (step S14) and it is shifted to a communication state by carrying out a connection process with the master (more specifically, shifted to a data transfer mode M12) (step S16).

Next, FIG. 11 will be explained. The apparatus which became a master (here, wireless key apparatus 50) starts a standby timer when the connection mode starts (step S21). A page signal is transmitted by a determined channel for a predetermined period (step S22). At that time, for example, an ID number which was set for the own apparatus is added to the page signal and at the same time, the ID number of the communication partner is also added. Then, it is judged whether or not there is a response from the slave after the transmission of the page signal (step S23). In case of no response, it is judged whether or not the counted value of the standby timer exceeds a determined time period TH2 (step S24). In a case when the counted value of the standby timer does not exceed the determined time period TH2, it is shifted to an idle process and it waits for a constant period (step S25) and thereafter, it returns to step S22 and the transmission process of the page signal is repeated.

Then, in a case when it is judged in step S23 that there is a response from the slave, a connection process with the slave is performed and it is shifted to a communication state (more specifically, shifted to a data transfer mode) (step S27). Also, in a case when the counted value of the standby timer exceeds the determined time period TH2 in step S24, it becomes a standby state (step S28) and a process for attempting a connection with the slave here is discontinued.

Figure 10:
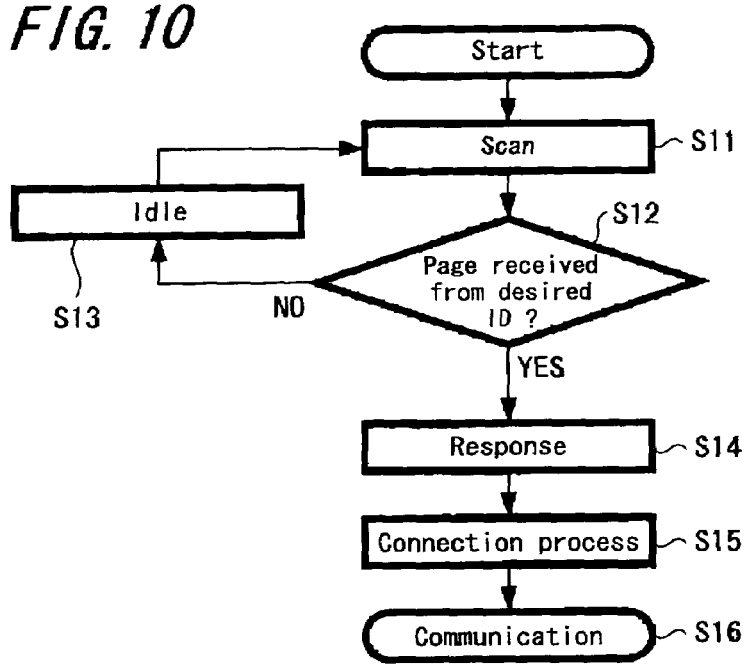
FIG. 10 is a flowchart showing a scanning process example according to one exemplified embodiment of the present invention.
Figure 11:
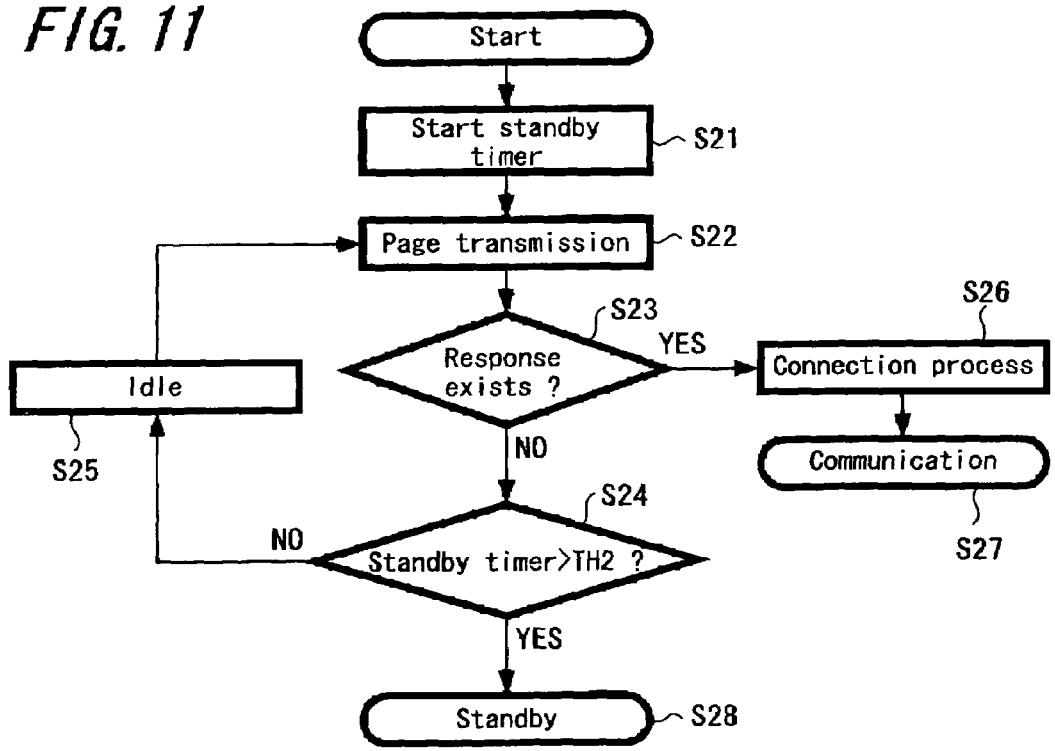
FIG. 11 is a flowchart showing a page transmission process example according to one exemplified embodiment of the present invention.
Figures 12A, 12B:
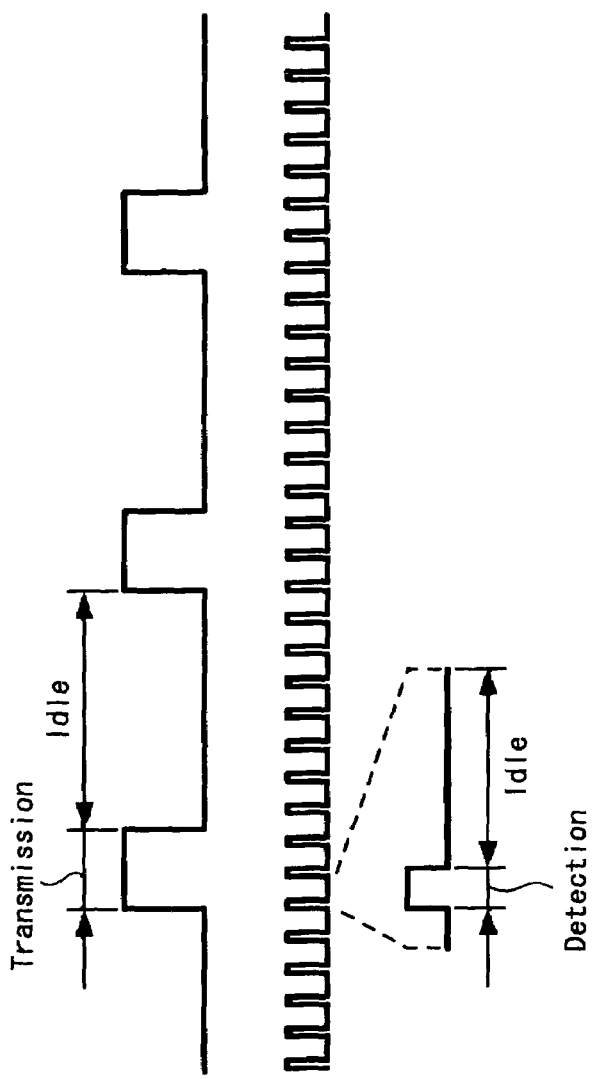
FIGS. 12A and 12B are timing diagrams showing an example of a process state of a page transmission and a scanning according to one exemplified embodiment of the present invention.

FIGS. 12A and 12B are diagrams showing an example of a communication state between the apparatus which became the master (wireless key apparatus 50) in which the process of the flowchart in FIG. 11 is carried out and the apparatus which became the master slave (mobile telephone terminal apparatus 10) in which the process of the flowchart in FIG. 10 is carried out. FIG. 12A shows a transmission timing of the page signal and an idle period of the master (wireless key apparatus 50). FIG. 12B shows a receiving (scan) timing and an idle period of the slave (mobile telephone terminal apparatus 10). As shown in FIGS. 12A and 12B, the idle period of the transmission side and the idle period of the receiving side are different from each other and it is constituted such that the page signal transmitted at any one of timings can be received on the receiving side.

Figure 13:
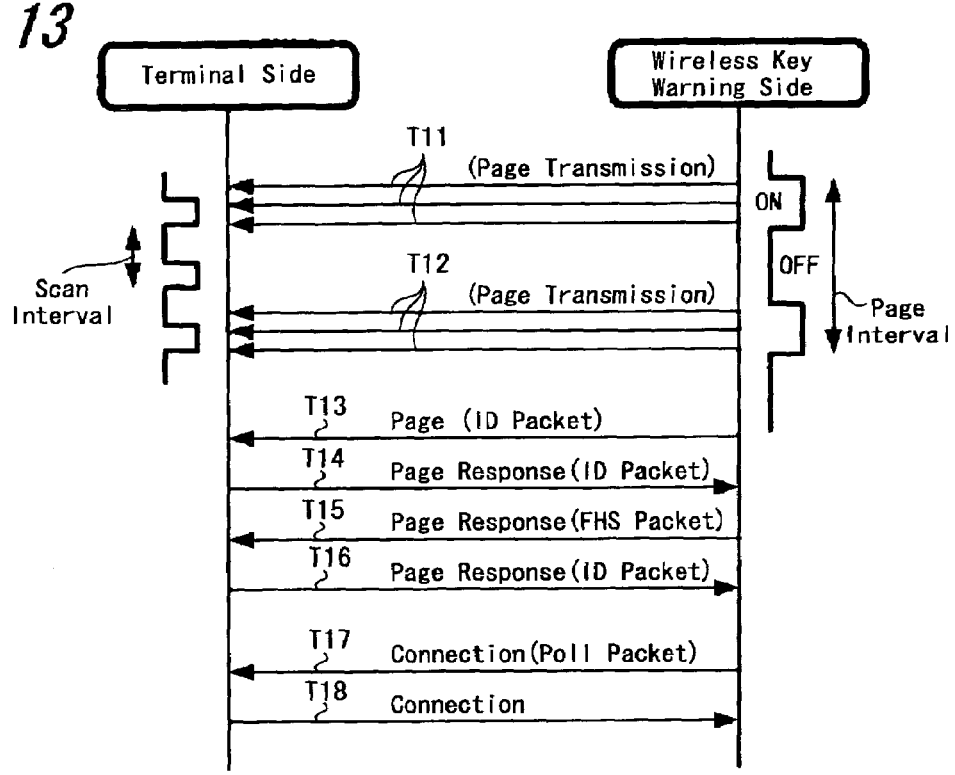
FIG. 13 is a sequence diagram showing an example of a connection state according to one exemplified embodiment of the present invention.

FIG. 13 is a diagram showing the process of FIG. 12 by a sequence diagram. As shown in FIG. 13, the transmission of the page signal is carried out from the wireless key apparatus 50 intermittently (at timing T11, T12, T13). Here, if there is a response with respect to the page signal (at timing T14), mutual exchange of the response between the two apparatuses are further carried out (at timing T15, T16), thereafter mutual exchange of the connection signal performing the wireless connection is carried out (at timing T17, T18) and it is shifted to a data transfer mode.

Next, a process example in a case when the respective apparatuses of the present invention are shifted to the data transfer mode M12 will be explained with reference to a flowchart of FIG. 12. When it is shifted to a data transfer mode, an authentication process in a channel in which the data transfer is carried out is performed (step S31). Then, it is judged whether or not the authentication was completed correctly (step S32). In a case when the authentication process is not completed here, it returns to the connection mode M11.

Then, in a case when the connection process in step S32 is completed, a data transfer is carried out ordinarily, but in the security process of the present invention, the data transfer is not carried out and a process for shifting to a low power consumption mode M13 is carried out directly (step S33). Then, it is judged whether or not it can be shifted to a low power consumption mode (step S34). In case of a state in which it can be shifted to a low power consumption mode M13, it is set to a sniff state of a low power consumption mode M13. In a case when it cannot be shifted to a low power consumption mode, it returns to the connection mode M11.

Figure 14:
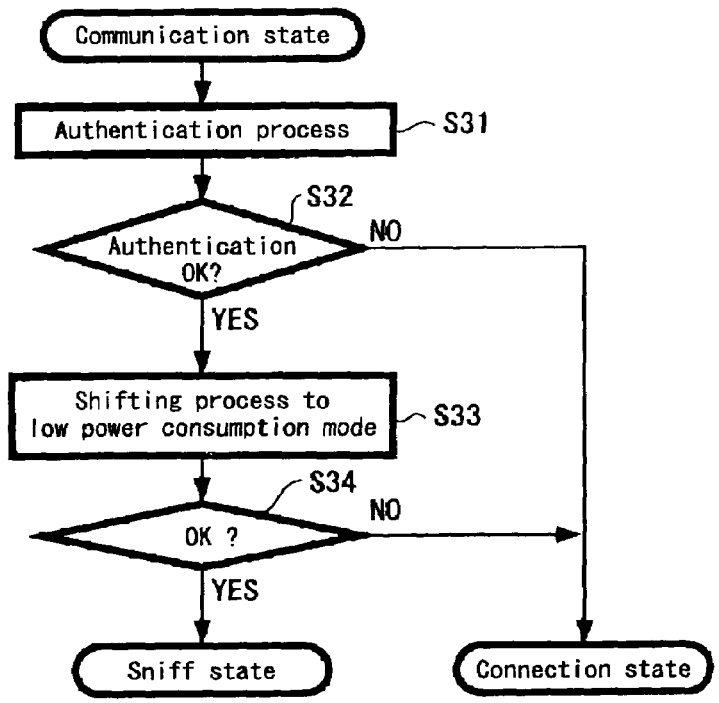
FIG. 14 is a flowchart showing a shifting process example for low power consumption according to one exemplified embodiment of the present invention.
Figure 15:
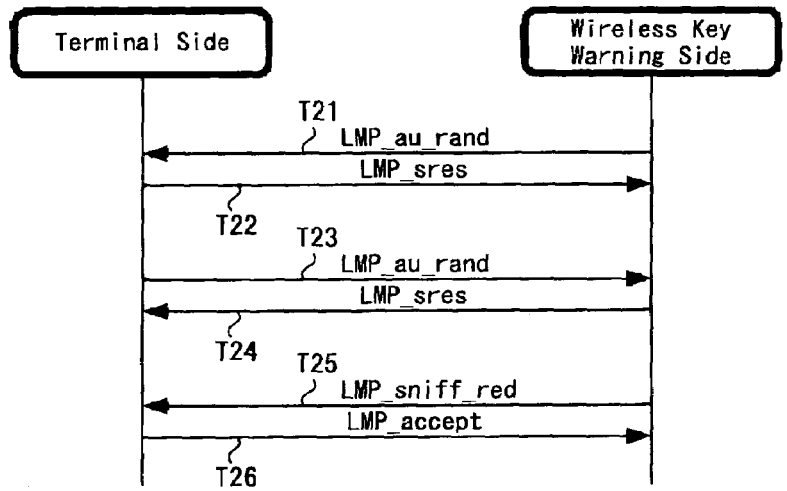
FIG. 15 is a sequence diagram showing a transmission example of a communication state message according to one exemplified embodiment of the present invention.

FIG. 15 is a sequence diagram showing an example of the communication state shown in the flowchart of FIG. 14. More specifically, packet transmission is carried out mutually in the data transfer mode M12 for performing authentication or the like (at timing T21, T22, T23, T24). Then, after the authentication is completed, data (sniff mode request) for shifting to a low power consumption mode is transmitted (at timing T25) from the master (wireless key apparatus 50) and its consent is received (at timing T26) such that both apparatuses are shifted to a low power consumption mode (sniff mode).

Figure 16:
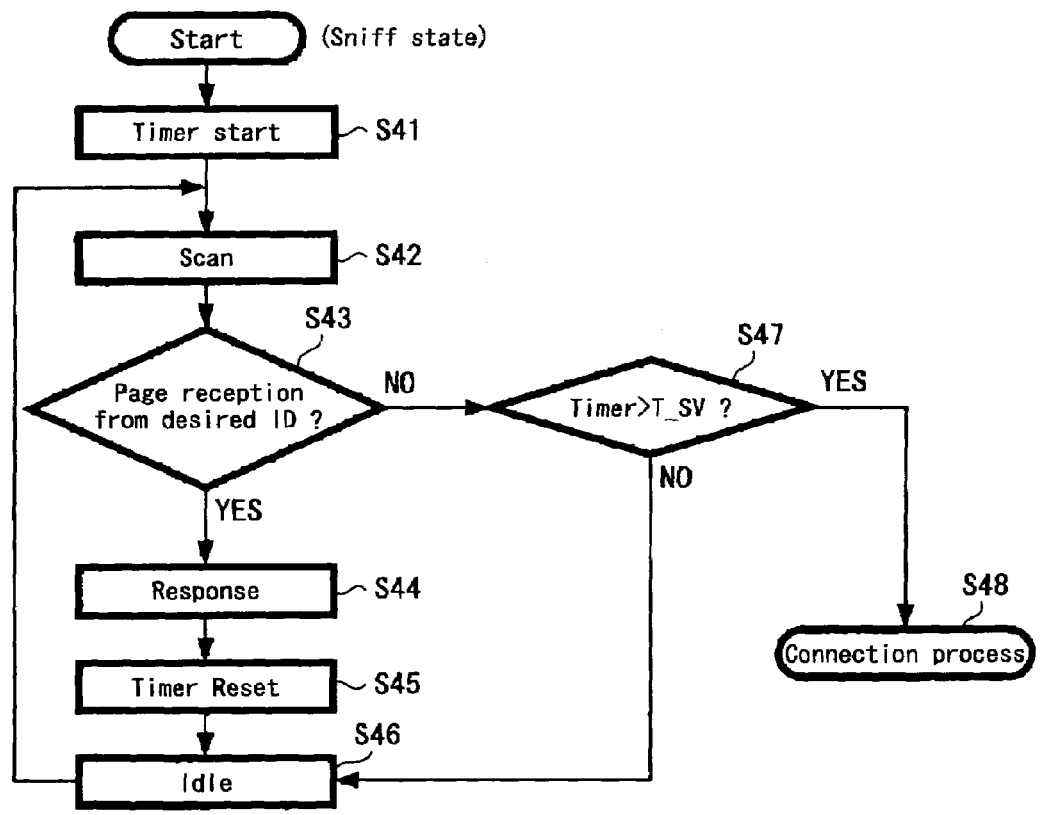
FIG. 16 is a flowchart showing a communication process example in a mobile terminal according to one exemplified embodiment of the present invention.

FIG. 16 is a flowchart showing a process example in a low power consumption mode M13 (sniff mode) relating to the slave (mobile telephone terminal apparatus 10). The process will be explained. When it becomes a sniff mode, first, a timer is started (step S41) and a scan process for receiving a signal from the master is carried out (step S42). It is judged subsequently to the scan process whether or not a signal (page signal) added with the ID number of the wireless key apparatus 50 which is a partner carrying out a security process was received (step S43). Here, in a case when a signal added with the ID number of the wireless key apparatus 50 is received, a response signal with respect to the page signal is transmitted (step S44). Then, the timer started in step S41 is reset (step S45) and it is shifted to an idle period (step S46). When an idle period of a constant period elapses, it returns to the scan process in step S42. Here, in case of the present invention, it is constituted such that the idle period in step S46 (period when communication is not carried out) is set as a relatively longer period and at the same time, it is constituted such that it is synchronized with the idle period on the master side.

On the other hand, in a case when it is judged in step S43 that a signal added with the ID number of the wireless key apparatus 50 is not received, it is judged whether or not the timer started in step S41 exceeded a predetermined value T_SV (step S47). Then, in a case when it does not exceed the predetermined value T_SV, the flow is shifted to the idle process of step S46. Then, in a case when step S47 it is judged it exceeds the predetermined value T_SV, the communication mode is changed to a connection mode M11 (step S48). The transmission power of the transmission amplifier may be changed to be higher when the communication mode is changed to a connection mode.

Figure 17:
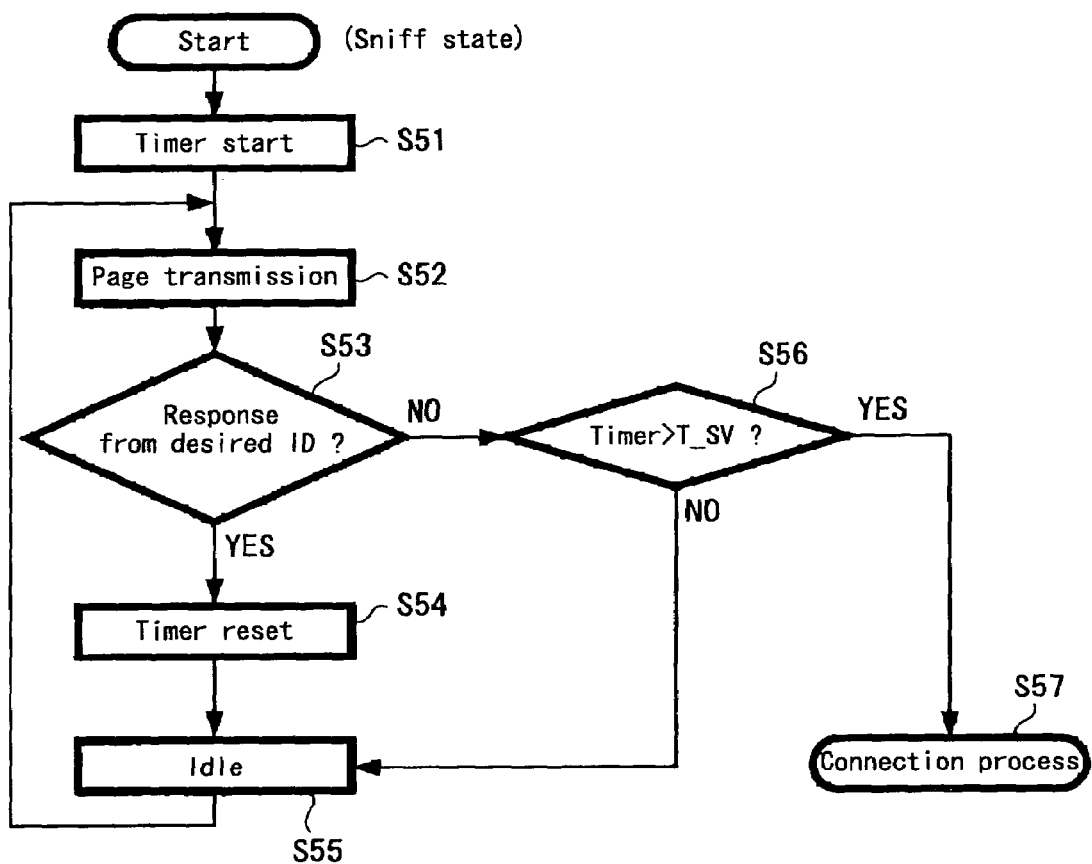
FIG. 17 is a flowchart showing a communication process example in a wireless key apparatus according to one exemplified embodiment of the present invention.

FIG. 17 is a flowchart showing a process example in the master (wireless key apparatus 50) with respect to the low power consumption mode (sniff mode). Its process will be explained. A first timer is started when it becomes a sniff mode (step S51). Then, a process for transmitting a page signal for a predetermined period is carried out (step S52). After the transmission of this page signal, it is judged whether or not a response from a partner (mobile telephone terminal apparatus 10) which carries out a security process was received (step S53) Here, in a case when the response signal is receive, the timer started in step S51 is to be reset (step S54). Then, the flow is shifted to the idle period (step S55). When an idle period of a constant period elapses, the flow returns to the page transmission process of step S52. Here, in case of the present invention, it is constituted such the idle period (period in which the communication is not carried out) in step S55 is to be set as a relatively long period and at the same time is to be synchronized with the idle period on the slave side.

On the other hand, in a case when it is judged in step S53 that a response from the mobile telephone terminal apparatus 10 is not received, it is judged whether or not the timer started in step S51 exceeded a predetermined value T_SV (step S56). In a case when it does not exceed the predetermined value T_SV, it is shifted to the idle process of step S55. Then, in a case when it is judged in step S56 that the predetermined value T_SV is exceeded, the communication mode is changed to a connection mode M11 (step S57). When the communication mode is changed to a connection mode M11, the transmission power of the transmission amplifier may be changed to be high.

Figure 18:
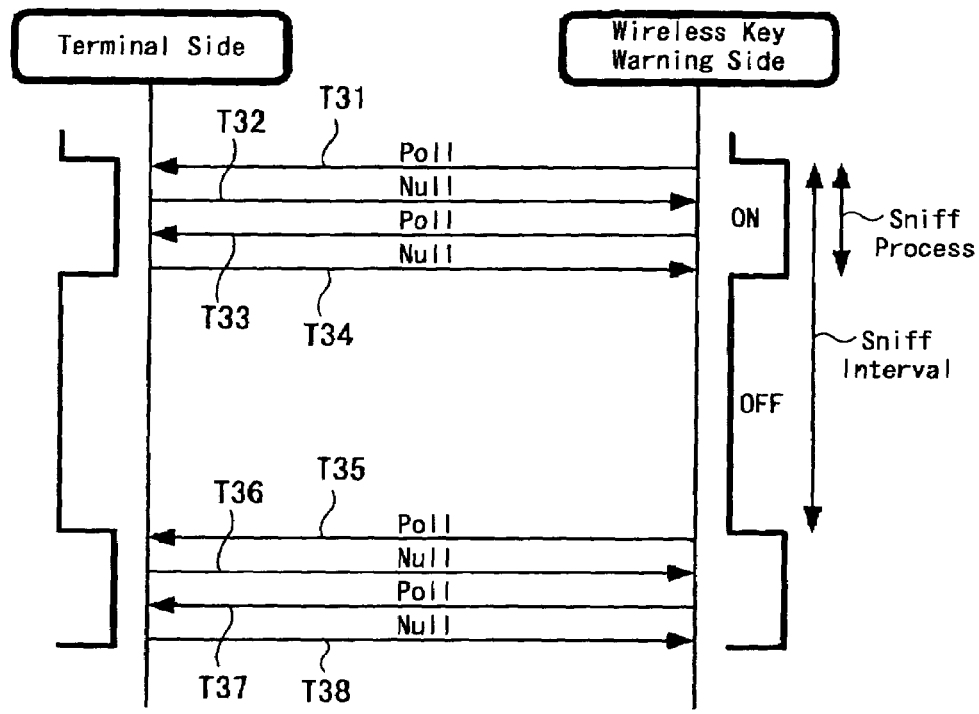
FIG. 18 is a sequence diagram showing a transmission example in a sniff state according to one exemplified embodiment of the present invention.

FIG. 18 is a sequence diagram showing communication timings in the both apparatuses in connection with a low power consumption mode (sniff mode) M13. As shown in FIG. 18, the timing at which the sniff process (portion describes as ON) is carried out in the master and the timing at which the sniff process is carried out in the slave approximately coincide with each other. More specifically, the timings (T31, T33, T35, T37) at which polling packets are transmitted from the master and the periods when the reception thereof are carried out in the slave approximately coincide with each other. Also, respective polling packets are received by the slave and with respect to the responses thereof (at timing T32, T34, T36, T38), they are received on the master side. Owing to the fact that an intermittent bidirectional communication is carried out in this manner, a low power consumption mode M13 is maintained and a wireless connection state between the master and the slave is maintained.

Figure 19:
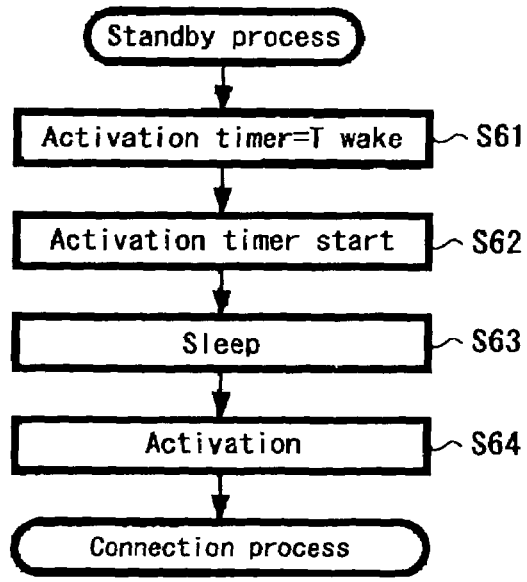
FIG. 19 is a flowchart showing a process example in a standby state according to one exemplified embodiment of the present invention.

It should be noted in a case when the communication mode becomes a standby state that, for example, a process shown in a flowchart of FIG. 19 is carried out. More specifically, when it becomes a standby state, an activation period is set for an activation timer (step S61). Then, the activation timer is started (step S62). Then, the communication circuit is made to be in a sleep state (step S63). Thereafter, when the period set by the activate timer elapses, the communication circuit is activated (step S64) and the flow is shifted to the connection mode M11 so as to execute a connection process.

Owing to a fact that the processes explained so far are executed, in a case when the mobile telephone terminal apparatus 10 and the wireless key apparatus 50 can wireless-communicate favorably in an adjacent state, the mobile telephone terminal apparatus 10 and the wireless key apparatus 50 are maintained in a wireless-connected state using a low power consumption mode. In this wireless-connected state using the low power consumption mode, a data transfer which becomes a so-called payload is not carried out and a signal for maintaining the wireless connection is only transmitted and received intermittent. In this case, by selecting the idle period properly, it is possible to carry out a communication with very low power consumption. Therefore, it is possible to lower the power consumption caused by carrying out the security process of the present invention and it is possible to make the battery duration periods of both the mobile telephone terminal apparatus 10 and the wireless key apparatus 50 be a longer period. In particular, there is a big effect on a wireless key apparatus which is desired to be constituted in a small size as much as possible.

Also, with respect to the mobile telephone terminal apparatus 10, a security process was carried out by applying a short distance wireless communication system of the Bluetooth system which has a great number of examples already mounted on mobile telephone terminals, so that the security process of the present invention can be realized only by slightly changing a control constitution or the like of a mobile telephone terminal provided with a short distance wireless communication circuit of an existing Bluetooth system and a favorable security function is realized easily.

The process explained up to here is a fundamental process for carrying out a security process according to the present invention, but here, it is constituted in the present invention such that the security assuring (practically, release of security process) of the mobile telephone terminal apparatus 10 is to be carried out based on a contributing factor other than the wireless connection between the mobile telephone terminal apparatus 10 and the wireless key apparatus 50.

Figure 20:
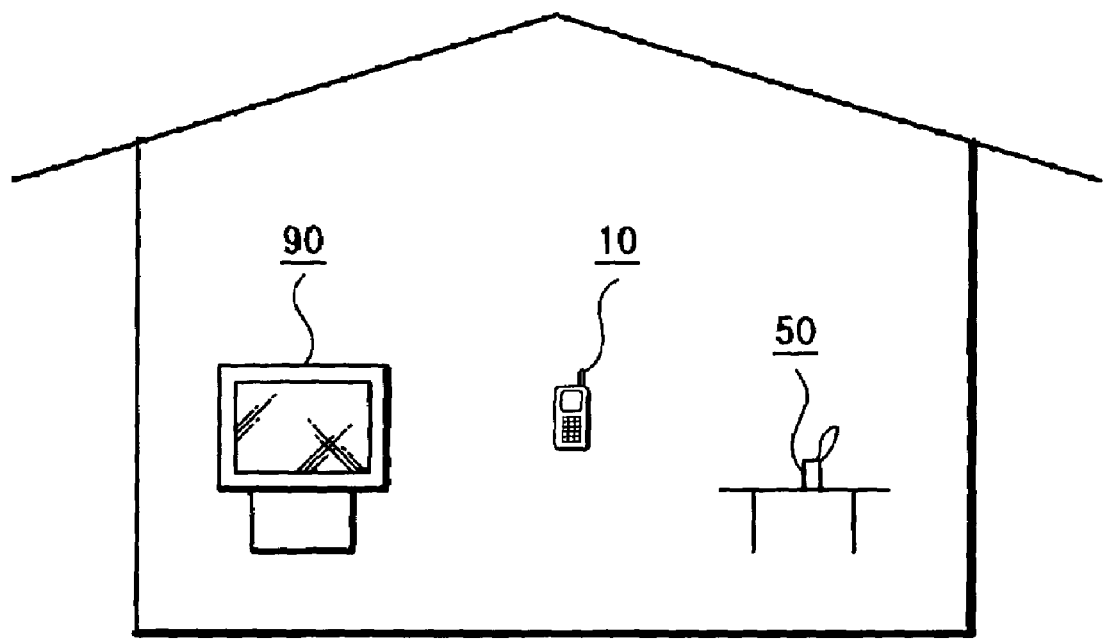
FIG. 20 is an explanatory diagram showing an example in home according to one exemplified example of the present invention.

FIG. 20 is a diagram for explaining a process according to the present invention. As already explained, it is constituted in case of a situation in which the mobile telephone terminal apparatus 10 is wireless-connected with the wireless key apparatus 50 such that the security assuring is performed and it is constituted in a case when the mobile telephone terminal apparatus 10 detects, in the short distance wireless communication circuit 32, a wireless signal from an apparatus registered beforehand other than the wireless key apparatus 50 (here, television receiver 90 equipped with a short distance wireless communication circuit by Bluetooth system) such that release of the security process is to be carried out. It is on the assumption that this television receiver 90 is an apparatus located in a safety region such as home. It may be an apparatus other than a television receiver if it is an apparatus which is located in a safety region and is equipped with a short distance wireless communication circuit by the Bluetooth system.

FIG. 21 shows a situation example of a short distance wireless communication by the Bluetooth system among the mobile telephone terminal apparatus 10, the wireless key apparatus 50 and a safety region identification apparatus (television receiver 90 in case of FIG. 20). In the drawings of FIG. 21 and FIG. 22, the apparatuses of states shown by black circles are apparatuses operating as masters, the apparatuses of states shown by white circles are apparatuses operating as slaves and the apparatuses of states shown by half black and half white circles are apparatuses operating as masters with respect to one apparatuses and operating as slaves with respect to the other apparatuses. Also, when it is in a state in which the spacing of two apparatuses is connected by a solid, it shows a wireless-connected state and when it is in a state in which the spacing there-between is connected by a dotted line, it shows a state in which a wireless connection is not carried out.

Figure 21A:
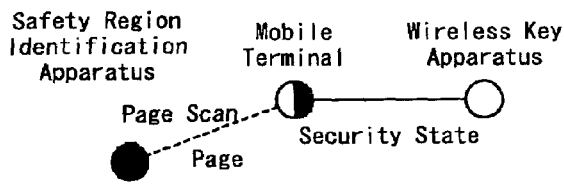
FIGS. 21A to 21D are state transition diagrams showing an operation example of a security release according to one exemplified example of the present invention.

As shown in FIG. 21A, the security of the mobile telephone terminal apparatus 10 is assured in a state in which the mobile telephone terminal apparatus 10 and the wireless key apparatus 50 are wireless-connected and it becomes a state in which the function of the mobile telephone terminal apparatus 10 is not limited. Here, the mobile telephone terminal apparatus 10 is made to be a master. It is constituted In this state such that the wireless communication circuit 32 in the wireless communication circuit 32 in the mobile telephone terminal apparatus 10 operates also as a slave in order to detect a signal from an apparatus equipped with a wireless circuit by the Bluetooth system other than the wireless key apparatus 50 and carries out an operation for searching a page signal from peripheral apparatuses. The process for searching the page signal (that is, process as a slave) is carried out in time divisional manner with a process for carrying out a communication with the wireless key apparatus 50 (here, process as a master).

Figure 21B:
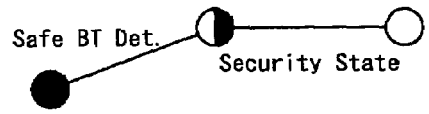
Figure 21C:
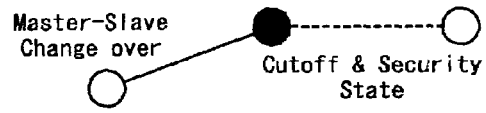
Figure 21D:
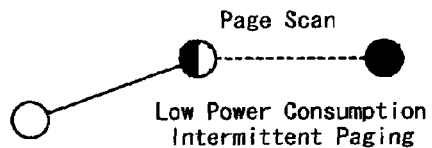

When a signal from the safety region identification apparatus 90 is detected by the search in the mobile telephone terminal apparatus 10 and a wireless connection is performed between the mobile telephone terminal apparatus 10 and the safety region identification apparatus 90 shown in FIG. 21B, the master and the slave are changed over with respect to the mobile telephone terminal apparatus 10 and the safety region identification apparatus 90 shown in FIG. 21C. In the state in which a wireless connection with the safety region identification apparatus 90 could be performed, the security process by the communication with the wireless key apparatus 50 is not necessary, so that it is constituted in the mobile telephone terminal apparatus 10 such that the wireless communication with the wireless key apparatus 50 is to be cut off. Then, as shown in FIG. 21D, it is constituted in a state in which the mobile telephone terminal apparatus 10 and the safety region identification apparatus 90 are wireless-connected such that a low power consumption intermittent paging process for searching the wireless key apparatus 50 intermittently is to be carried out. It should be noted in a case when it becomes a state in which the mobile telephone terminal apparatus 10 cannot be wireless-connected with the safety region identification apparatus 90 that a wireless connection with the wireless key apparatus 50 is performed once again and a security mode is to be set according to that connection state.

Figure 22A:
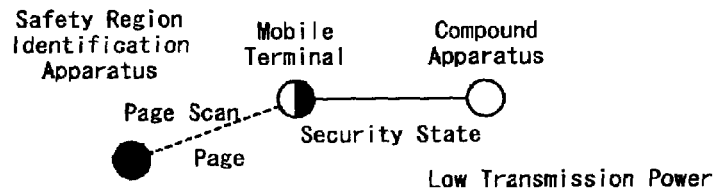
FIG. 22A to 22C are state transition diagrams showing an operation example of a security release (example in a case when wireless key is compound apparatus) according to one exemplified example of the present invention.

It should be noted in a case when the wireless key apparatus is a compound apparatus combined with another function (for example, head set with wireless key 60 shown in FIG. 5) that the transmission power in the compound apparatus may be controlled as shown in FIG. 22. More specifically, in a state in which the mobile telephone terminal apparatus 10 and the compound apparatus with wireless key function are wireless-connected as shown in FIG. 22A, it becomes a state in which the security of the mobile telephone terminal apparatus 10 is assured and the function of the mobile telephone terminal apparatus 10 is not limited. At that time, the transmission power the compound apparatus is a low transmission power.

Figure 22B:
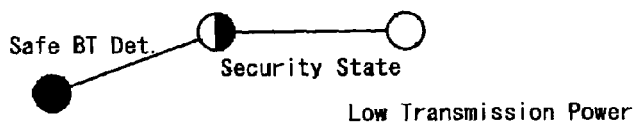
Figure 22C:
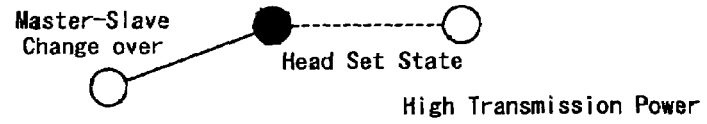

It is assumed in this state that page signals from peripheral apparatuses were searched and a signal from the safety region identification apparatus 90 was detected. At that time, it is assumed that a wireless connection was performed between the mobile telephone terminal apparatus 10 and the safety region identification apparatus 90 as shown in FIG. 22B and the master and the slave were changed over with respect to the mobile telephone terminal apparatus 10 and the safety region identification apparatus 90 as shown in FIG. 22C. It is assumed in the state in which a wireless connection could be performed with the safety region identification apparatus 90 that it is necessary for the mobile telephone terminal apparatus 10 and the compound apparatus with wireless key function to carry out a wireless communication as a head set. In this case, it is not necessary with respect to the compound apparatus with wireless key function to limit the range in which the security function operates, so that it is constituted such that the transmission power is made to be a high transmission power and it is made possible for the wireless communication distance between the mobile telephone terminal apparatus 10 and the compound apparatus with wireless key function assure a certain degree of distance. Here, it may be constituted in a case when it becomes a state in which a security process is necessary for the communication in the compound apparatus with wireless key function such that it is returned to a low transmission power.

Figure 23:
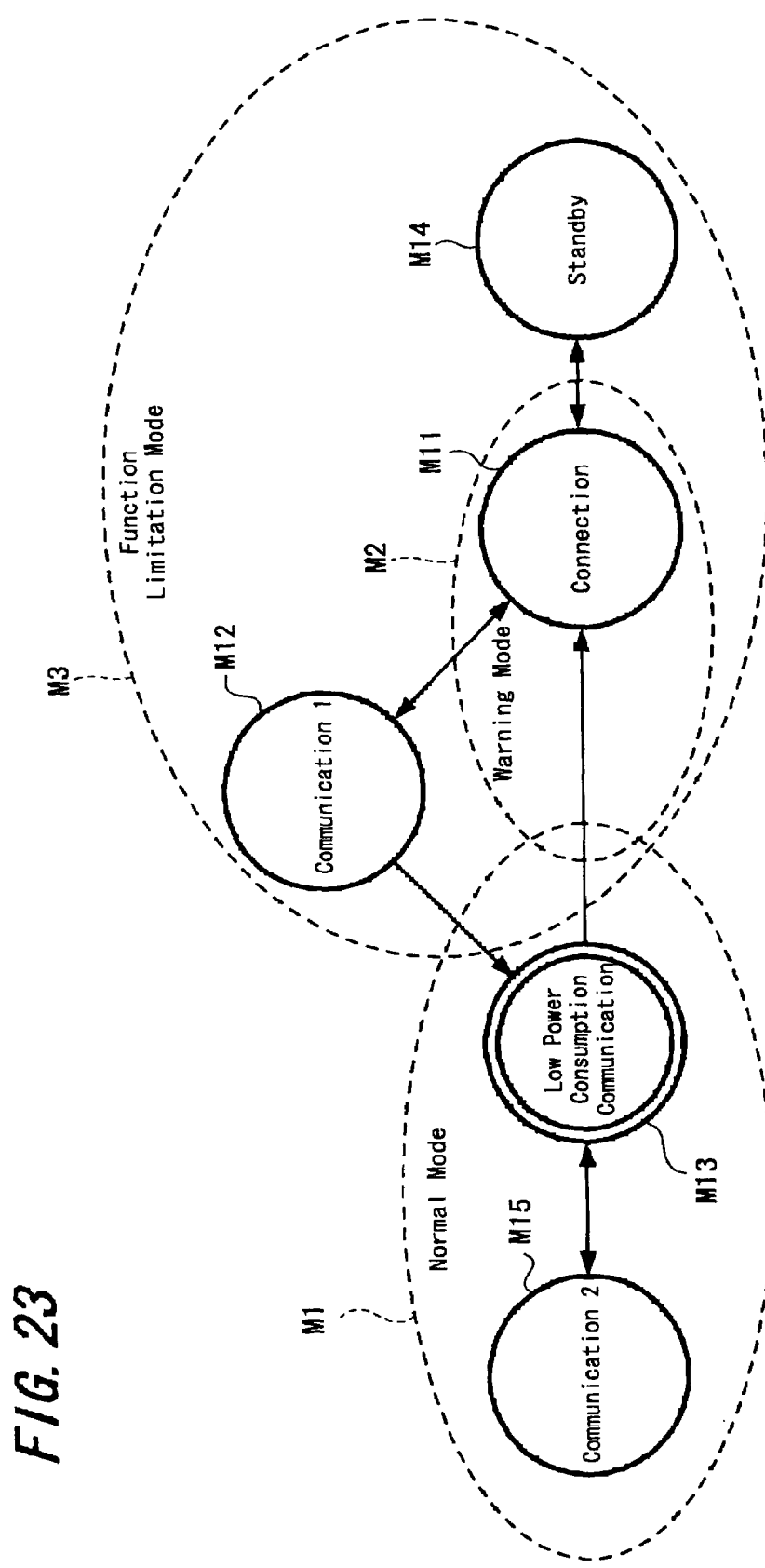
FIG. 23 is an explanatory diagram showing a mode transition example (example in a case when wireless key is compound apparatus) according to one exemplified example of the present invention.

FIG. 23 is a diagram showing a communication mode setting example in the compound apparatus with wireless key function shown in FIG. 22. This diagram is same as the mode transition shown in FIG. 8 with the exception of the normal mode (but data transfer mode M12 is made to be a communication 1 mode). In case of this example, it is not necessary for the compound apparatus with wireless key function to carry out a communication for the security function and it is constituted in a case when it carries out a wireless communication as a head set such that the flow is to be shifted from the low power consumption communication mode M13 to the communication 2 mode M15. It is constituted in the communication 2 mode M15 such that a data transfer is carried out by a high transmission power of the transmission power and sound data or the like can be transferred favorably.

Figure 24:
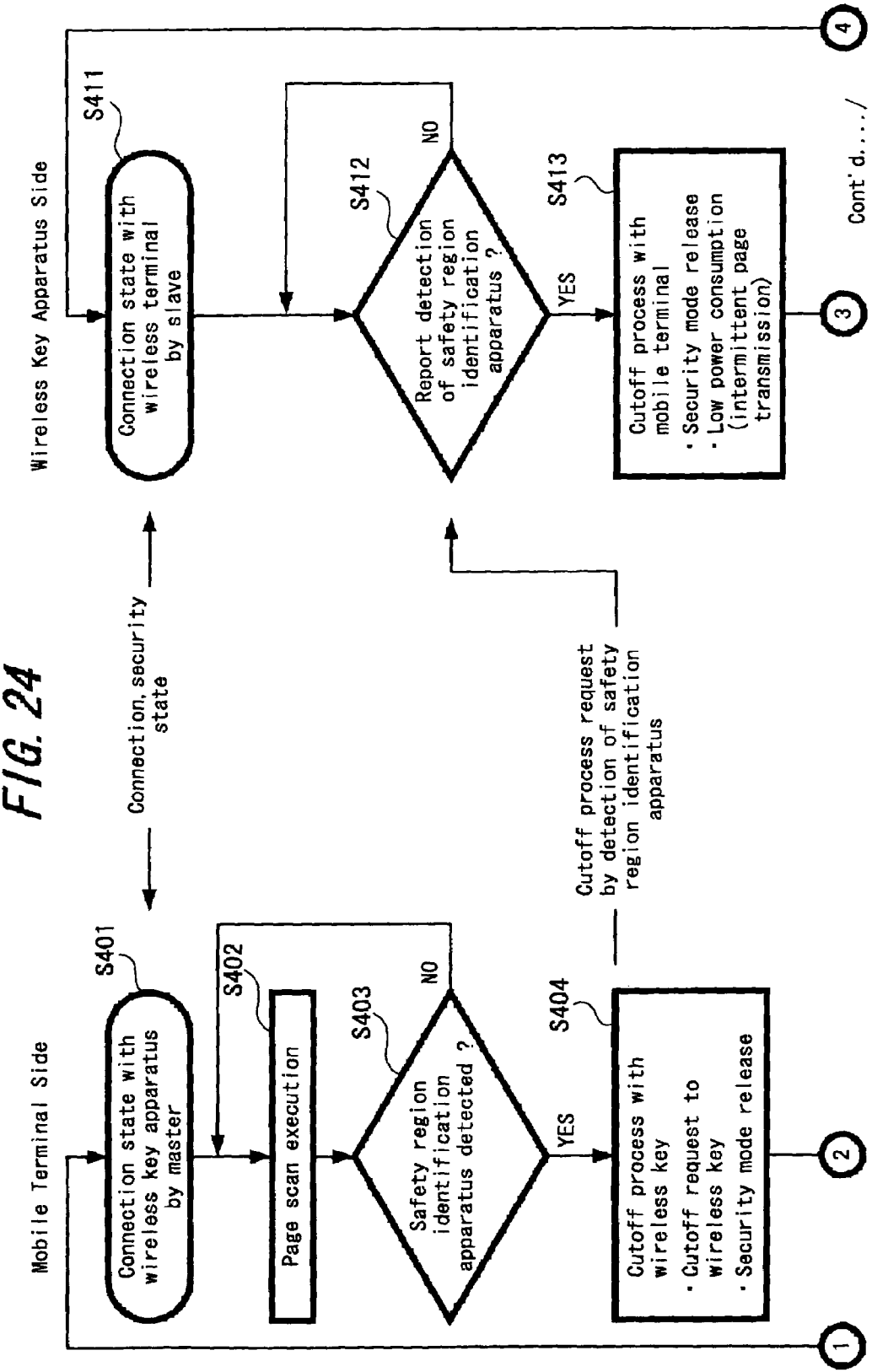
FIG. 24 is a flowchart showing a process example of an automatic security release according to one exemplified example of the present invention.

Next, a process example in a case when the safety region identification apparatus 90 was detected in a state in which the mobile telephone terminal apparatus 10 and the wireless key apparatus 50 carry out a wireless communication and the security was assured will be explaining with reference to a flowchart of FIG. 24. In FIG. 24, the left-hand side shows processes of the mobile telephone terminal apparatus 10 and the right-hand side processes of the wireless key apparatus 50.

First, it is assumed that it becomes a master state and is wireless-connected with the wireless key apparatus 50 in the mobile telephone terminal apparatus 10 (step S401) and it becomes a slave state and is wireless-connected therewith in the wireless key apparatus 50 (step S411). In this state, the scan of page signals transmitted from the peripheral is executed in the mobile telephone terminal apparatus 10 (step S402) and it is judged whether or not the safety region identification apparatus 90 could be detected (step S403). In a case when the safety region identification apparatus 90 cannot be detected, the page signal scan is repeated and security assuring is carried out by the wireless connection state with the wireless key apparatus 50.

Then, in a case when the safety region identification apparatus 90 was detected, a process for cutting off the wireless connection with the wireless key apparatus 50 is carried out (step S404). Specifically, a cutoff request is transmitted to the wireless key apparatus 50 and the security mode is released.

When the wireless key apparatus 50 receives the cutoff request (step S412), a cutoff process with respect to the mobile telephone terminal apparatus 10 is carried out, the security mode is released also on the side of the wireless key apparatus 50 and it is made to an intermittent page transmission mode of a low power consumption (step S413). It is allowed for the intermittent page transmission mode of low power consumption here to be a transmission the interval of which is made to be long and which transmits more than, for example, the communication in the low power consumption communication mode M13 shown in FIG. 5. It is made to be a very long period such as a transmission, for example, of one time every ten minutes.

When it becomes such a state, it becomes a master state in the mobile telephone terminal apparatus 10 and it becomes a connection state with the safety region identification apparatus 90 (step S405), and in the wireless key apparatus 50, it becomes an unconnected state and an intermittent page transmission mode of low power consumption.

In the mobile telephone terminal apparatus 10 of this state, the scan of the page signal transmitted from the peripheral is executed (step S406) and it is judged whether or not the wireless key apparatus 50 could be detected (step S407). In a case when the wireless key apparatus 50 cannot be detected, the page signal scan is repeated. Then, in a case when the page signal from the wireless key apparatus 50 was detected, it is judged whether or not it is under a connection with the safety region identification apparatus 90 (step S408) and in a case when it is under a connection with the safety region identification apparatus 90, connection request by the page signal is rejected (step S410) and the flow returns to the page signal scan. In a case in step S408 when it is not under a connection with the safety region identification apparatus 90, a connection process with the wireless key apparatus 50 is carried out, a security mode is set and the flow returns to the process of step S401.

In the wireless key apparatus 50 which became an intermittent page transmission mode of low power consumption in step S414, a page signal is transmitted periodically (step S415) and it is judged from that response whether or not the mobile telephone terminal apparatus 10 was detected (step S416). In a case when it is not detected, the transmission of step S415 is carried out by a long interval. In a case when it was detected, it is judged whether or not the response is a connection rejection (step S417) and in a case when it is a connection rejection, the transmission of step S415 is carried out by a long interval. Then, it is not a connection rejection, it is connected with the mobile telephone terminal apparatus 10, the security mode is set (step S418) and the flow returns to the process of step S411.

Figure 25:
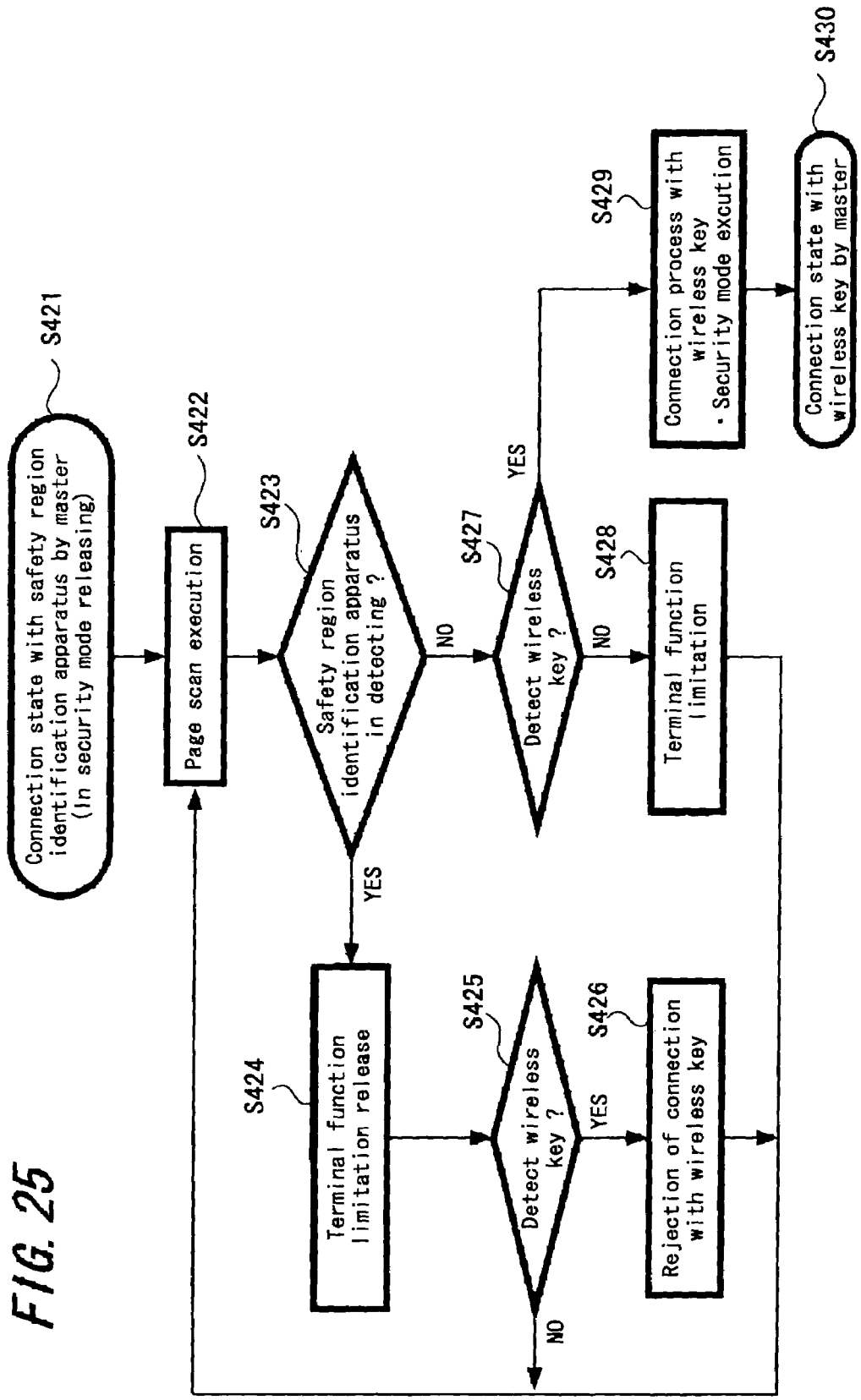
FIG. 25 is a flowchart showing a process example in a safety region according to one exemplified example of the present invention.

Then, when the mobile telephone terminal apparatus 10 is under a connection with the safety region identification apparatus 90, a flowchart process of FIG. 25 is executed as a process in the communication with the safety region identification apparatus 90. More specifically, when it is wireless-connected with the safety region identification apparatus 90 (step S421), a page signal scan is executed (step S422), it is judged whether or not the state at present is under a connection with the safety region identification apparatus 90 (step S423), when it is under a connection, the state is made to be a state in which a function limitation of the terminal is not carried out (step S424) and it is judged in that state whether or not the wireless key apparatus 50 was detected (step S425). In a case when the wireless key apparatus 50 is not detected, the flow returns to the page signal scan of step S422. In a case when it was detected, the connection with the wireless key apparatus is rejected (step S426).

Also, in a case in step S423 when it is not under a connection with the safety region identification apparatus 90, it is judged whether or not the wireless key apparatus 50 was detected (step S427). In a case when the wireless key apparatus 50 is not detected, the function of the mobile telephone terminal apparatus 10 is limited (step S428) and the flow returns to the page signal scan of step S422. In a case when it was detected, a communication with the wireless key apparatus is carried out, a security mode is set (step S429) and the connection with the wireless key apparatus is maintained (step S430).

Figure 26:
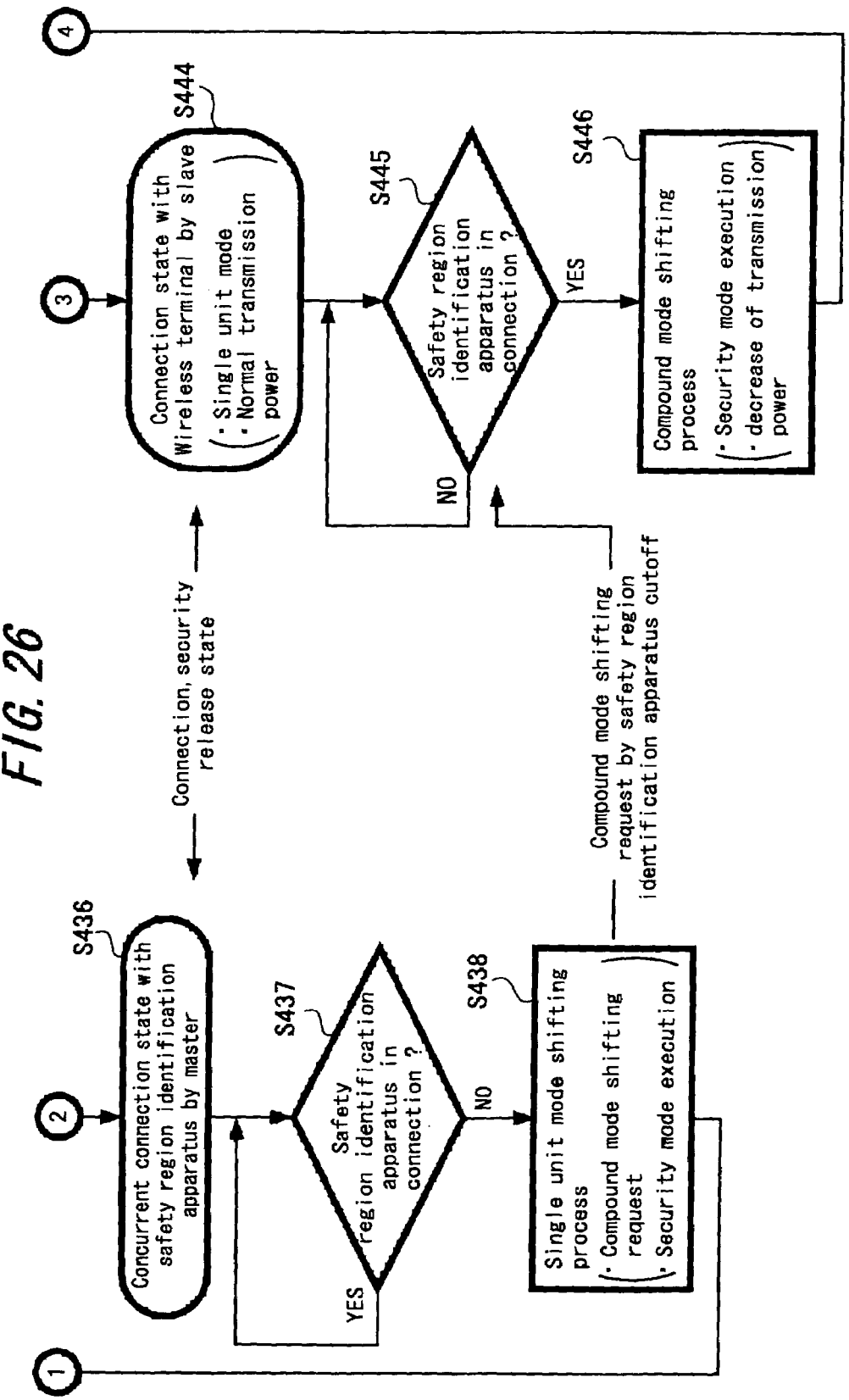
FIG. 26 is a flowchart showing a process example of an automatic security release according to one exemplified example of the present invention.

The process of FIG. 24 is an example in a case when the wireless key apparatus is a single unit apparatus and in a case when the wireless key apparatus is a compound apparatus with wireless key function (here, head set with wireless key 60), a process, for example, shown in FIG. 26 is carried out. In FIG. 26, the left-hand side shows processes of the mobile telephone terminal apparatus 10 and the right-hand side shows processes of the wireless key apparatus 60.

First, it is assumed that it becomes a master state and is wireless-connected with the compound apparatus with wireless key function in the mobile telephone terminal apparatus 10 (step S431) and it becomes a slave state and is wireless-connected therewith in the compound apparatus with wireless key function (step S441). In this state, the scan of page signals transmitted from the peripheral is executed in the mobile telephone terminal apparatus 10 (step S442) and it is judged whether or not the safety region identification apparatus 90 could be detected (step S443). In a case when the safety region identification apparatus 90 cannot be detected, the page signal scan is repeated and security assuring is carried out by the wireless connection state with the compound apparatus with wireless key function.

Then, in a case when the safety region identification apparatus 90 was detected, a request for shifting the head set with a wireless key to a single unit mode of the head set is transmitted with respect to the head set with wireless key (step S434).

When the head set with a wireless key receives this request (step S442), it is changed to a single unit mode, the security mode is released and the transmission power is made to be high (normal transmission power is set) (step S443) The security mode is released also in the mobile telephone terminal apparatus 10 (step S435).

Then, it becomes a mode in which the mobile telephone terminal apparatus 10 becomes in a master state and carries out a communication with the safety region identification apparatus 90 and the head set with a wireless key at the same time (step S436); it is judged whether or not it is under a connection with the safety region identification apparatus 90 (step S437); when it is under a connection, the process is maintained and further carried out, when it is under a connection; when it comes to not be under a connection, a request for shifting the head set with wireless key from the single unit mode of the head set to the original compound mode is transmitted with respect to the head set with a wireless key (step S438); and the security mode is set.

When it is changed to a single unit mode in step S443 on the head set with wireless key side, it becomes a slave and carries out a communication with the mobile telephone terminal apparatus 10 (step S444); it is judged by a signal from the mobile telephone terminal apparatus 10 whether or not it is under a connection with the safety region identification apparatus 90 (step S445); in a case when it is under a connection, the process is maintained and carried out in the same mode; in a case when it is not under a connection, the flow is shifted to the original compound mode (step S446); and the transmission power is made to be a low transmission power.

By being processed in this manner, the process in case of being a compound apparatus can be carried out in an optimum state in either one of the cases when it is a compound mode and when it a single unit mode. More specifically, in case of being a compound mode, it is a low transmission power, so that even if it goes away from the mobile telephone terminal apparatus 10, for example, by several meters, the security mode is changed and the function limitation can be carried out favorably. Also, in case of being a single unit mode as a head set, even if a considerable degree of distance exists with respect to the mobile telephone terminal apparatus 10, the wireless communication can be carried out favorably and it functions as a head set favorably.

It should be noted that it was constituted in the above-mentioned exemplified examples such that it is assumed as a safety region and the security process is to be released when it was detected in the short distance wireless communication circuit 32 of the mobile telephone terminal apparatus 10 that a wireless communication can be carried out with a specific apparatus, but it may be constituted such that the safety region detection means is formed as means for detecting the absolute position of the terminal apparatus 10 and in a case when the position detected by that position detection means is in a safety region registered beforehand, the security process is to be released. A process for detecting the absolute position, for example, by carrying out an arithmetic process in which a signal for position measurement from a satellite referred to as GPS (Global Positioning System) is received and analyzed can be applicable for the position detecting means. Alternatively, it is possible in case of the mobile telephone terminal apparatus 10 to detect the absolute position by a certain degree of accuracy according to the base station ID with which the communication circuit 12 can wireless-communicate or the like and that process is applicable thereto. Then, in a case when the position detected in this manner is a position within the safety area such as inside of home or the like which was registered beforehand, it is enough if the security process is released.

Figure 27:
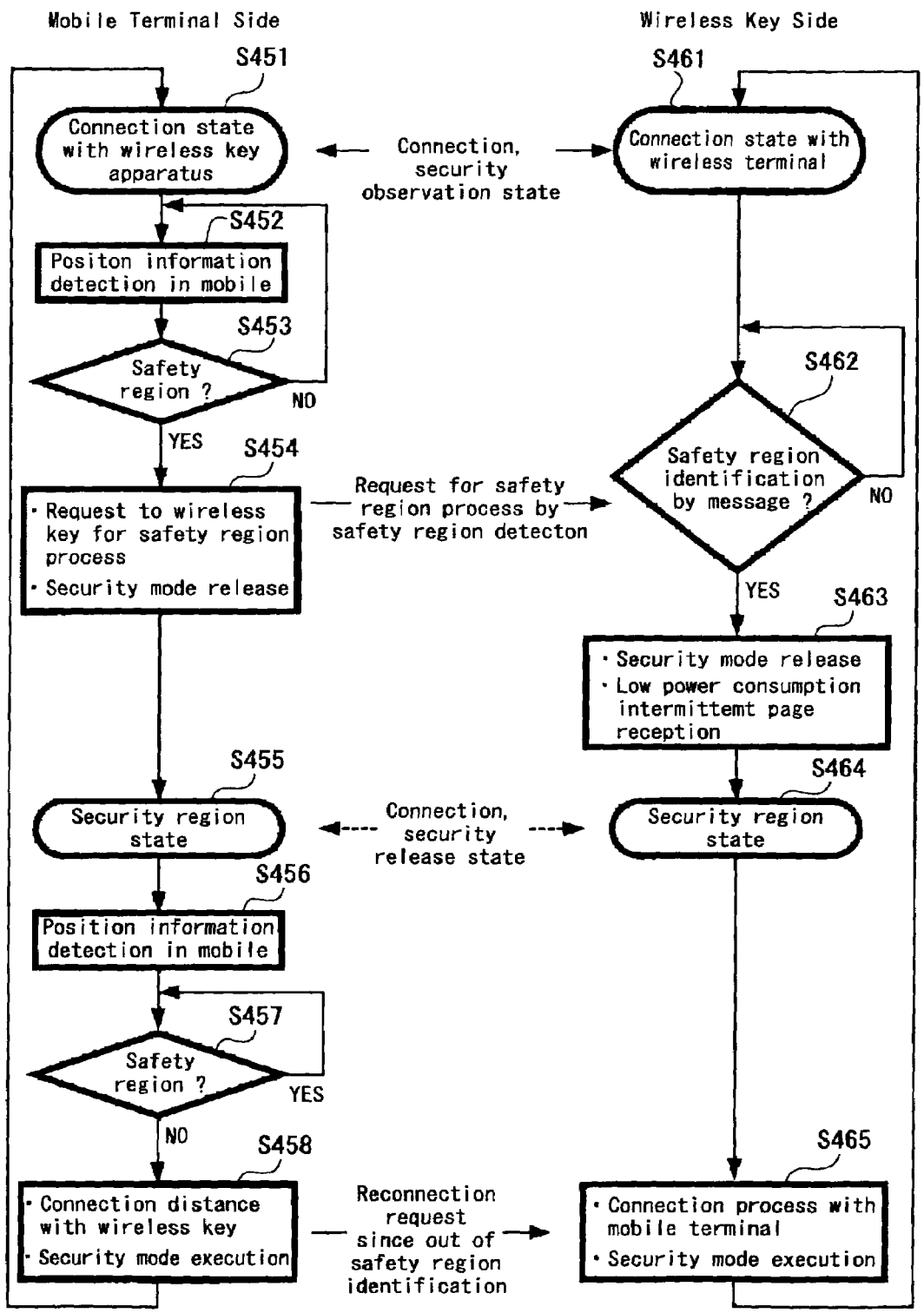
FIG. 27 is a flowchart showing a process example of an automatic security release according to another exemplified example of the present invention.

FIG. 27 is a flowchart showing a process example in that case. In FIG. 27, the left-hand side shows processes of the mobile telephone terminal apparatus 10 and the right-hand side shows processes of the wireless key apparatus 50.

First, it is assumed that it is wireless-connected with the wireless key apparatus 50 in the mobile telephone terminal apparatus 10 (step S451) and is wireless-connected with the mobile telephone terminal apparatus 10 in the wireless key apparatus 50 (step S461). In this state, the position at present is detected in the mobile telephone terminal apparatus 10 (step S452) and it is judged whether or not the detected position is in the safety region (step S453). In a case when it is not in the safety region, the flow returns to step S452.

Then, in a case when it is in the safety region, a process for cutting off the wireless connection with the wireless key apparatus 50 is carried out (step S454). Specifically, a cutoff request is transmitted to the wireless key apparatus 50 and the security mode is released.

When the wireless key apparatus 50 receives the cutoff request (step S462), a cutoff process with respect to the mobile telephone terminal apparatus 10 is carried out, the security mode is released also on the side of the wireless key apparatus 50 and it is made to an intermittent page transmission mode of a low power consumption (step S463). It is allowed for the intermittent page transmission mode of low power consumption here to be a transmission the interval of which is made to be long and which transmits more than, for example, the communication in the low power consumption communication mode M13 shown in FIG. 5. It is made to be a very long period such as a transmission, for example, of one time every ten minutes.

When it becomes such a state, it becomes a process in the safety region in the mobile telephone terminal apparatus 10 (step S455), and also in the wireless key apparatus 50, it becomes a process in the safety region (step S464).

In this state, the position at present is detected in the mobile telephone terminal apparatus 10 (step S457) and it is judged whether or not the detected position is in the safety region (step S458). In a case when it is in the safety region, it waits as it is and the position detection is carried out when it is needed. When it is detected that it becomes out of the safety region, a connection process with the wireless key apparatus 50 is carried out, a security mode is set (step S458) and the flow returns to step S451.

In the wireless key apparatus 50 which came to have the process in the safety region in step S464, it is connected with the mobile telephone terminal apparatus 10 when a signal is received from the terminal in step S458, a security mode is set (step S465) and the flow returns to the process of step S461.

In this manner, a similar process as in the case in which the safety region identification apparatus is detected becomes possible also with respect to carrying out the position detection.

Also, in the above mentioned exemplified embodiment, short distance wireless communication means by Bluetooth system or the like is installed in the mobile telephone terminal apparatus 10 and that short distance wireless communication means is used for actuating the security mode, but it may be constituted, for example, such that the short distance wireless communication means is not to be installed in the mobile telephone terminal apparatus 10 and short distance wireless communication means is to be connected to the mobile telephone terminal apparatus 10 externally. More specifically, it may be constituted, for example, such that two of apparatuses corresponding to the wireless key apparatus are prepared and one of the two wireless key apparatuses is connected to the mobile telephone terminal 10 and the security mode is to be set according to the communication mode in the two of the wireless key apparatuses.

Also, in the exemplified embodiment explained so far, a communication circuit of a Bluetooth system was installed in a mobile telephone terminal such that a wireless communication is to be carried out with the wireless key apparatus by that communication circuit, but it may be constituted such that a wireless communication is to be carried out with the wireless key apparatus by means of another wireless communication system. More specifically, if it is a system which at least includes a first communication mode which enables a data transfer as a wireless communication system between both apparatuses which communicate each other and a second communication mode which carries out a wireless communication between both the apparatuses in a period shorter than that of the communication in the first communication mode in a wireless-connected state maintained, similar processes as those of the exemplified embodiment mentioned above are possible and applicable.

Also, in the exemplified embodiment mentioned above, it was applied to the security assuring process of the mobile telephone terminal apparatus, but it may be constituted such that it is applied to a process for assuring the security of other mobile type.

Further, also with respect to the wireless key apparatus, an example which was constituted as a key apparatus for exclusive use was employed in the exemplified embodiment mentioned above, but it may be constituted such that a program which makes if function as a key apparatus of the present invention is installed to a terminal apparatus capable of communicating by the Bluetooth system or the like (for example, PDA apparatus or the like) so as to function as a key apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system which includes a communication terminal apparatus and a wireless key apparatus capable of a wireless communication with the communication terminal apparatus by a predetermined wireless communication system and limits a function of said communication terminal apparatus in response to a communication state between said communication terminal apparatus and said wireless key apparatus,
   wherein said wireless key apparatus comprises:
      a communication circuit for carrying out a wireless communication by said predetermined wireless communication system; and
      a control unit for controlling so as to make a communication connection with said communication terminal apparatus in said communication means;
   said communication terminal apparatus comprises;
      a communication circuit for carrying out a wireless communication by said predetermined wireless communication system, and
      a control unit for controlling a communication state in said communication circuit and for limiting a function of said terminal apparatus when a predetermined communication state with said wireless key apparatus cannot be maintained and for not limiting the function of said terminal apparatus regardless of the communication state with said wireless key apparatus when said communication terminal apparatus detects is a predetermined region,
   wherein the control unit of said communication terminal apparatus terminates the wireless connection with said wireless key apparatus in said communication circuit when it is detected that said communication terminal apparatus is in a predetermined region.

2. The communication system according to claim 1, wherein the control means of said communication terminal apparatus and/or said wireless key apparatus reconnects the terminated wireless connection.

3. The communication system according to claim 1, wherein it is detected that said communication terminal apparatus exists in a predetermined region by being wireless-connected with an apparatus which was registered beforehand in the communication circuit in said communication terminal apparatus.

4. The communication system according to claim 1, wherein it is detected that said communication terminal apparatus is in a predetermined region by detecting the absolute position of said communication terminal apparatus.

5. The communication system according to claim 1, wherein said wireless key apparatus includes another function for realizing a function other than limiting the function of said communication terminal apparatus;
   in a state in which it is detected that said communication terminal apparatus exists in a predetermined region, the communication in the communication circuit in said communication terminal apparatus and/or said wireless key apparatus is to be set in a communication state for said another function.

6. A communication terminal apparatus which limits a function in response to a communication state with respect to a wireless key apparatus, the communication terminal apparatus comprising:
   a communication circuit for carrying out a wireless communication with said wireless key apparatus by said predetermined wireless communication system; and
   a control unit for controlling a communication state in said communication means, at the same time for limiting the function of said terminal apparatus when a predetermined communication state cannot be maintained with respect to said wireless key apparatus and at the same time and for not limiting the function of said terminal apparatus regardless of the communication state with respect to said wireless key app apparatus when it is detected that said communication terminal apparatus exists in said predetermined region,
   wherein the control unit terminates the wireless connection with said wireless key apparatus in said communication circuit when it is detected that said communication terminal apparatus is in a predetermined region.

7. The communication terminal apparatus according to claim 6, wherein the control means reconnects the terminated wireless connection.

8. The communication terminal apparatus according to claim 6, wherein it is detected that said communication terminal apparatus exists in a predetermined region by being wireless-connected with an apparatus which was registered beforehand in the communication circuit in said communication terminal apparatus.

9. The communication terminal apparatus according to claim 6, wherein it is detected that said terminal apparatus is in a predetermined region by detecting the absolute position of said communication terminal apparatus.

10. A communication system including a communication terminal apparatus and a wireless key apparatus capable of a wireless communication with the communication terminal apparatus by a predetermined wireless communication system and limits a function of said communication terminal apparatus in response to a communication state between said communication terminal apparatus and said wireless key apparatus, wherein said wireless key apparatus comprises:

communication means for carrying out a wireless communication by said predetermined wireless communication system, and control means for controlling in said communication means so as to make a communication connection with said communication terminal apparatus; and said communication terminal apparatus comprises;

communication means for carrying out a wireless communication by said predetermined wireless communication system, detection means for detecting that it is a predetermined region, and control means for controlling a communication state in said communication means, for limiting a function of said terminal apparatus when a predetermined communication state with said wireless key apparatus cannot be maintain and for not limiting the function of said terminal apparatus regardless of the communication state with said wireless key apparatus when it is detected that it is a predetermined region, wherein the control unit of said communication terminal apparatus terminates the wireless connection with said wireless key apparatus in said communication circuit when it is detected that said communication terminal apparatus is in a predetermined region.

11. A wireless key apparatus which carries out a wireless communication with a predetermined communication terminal apparatus and regulates the function operation of said communication terminal apparatus comprising:

a communication circuit for carrying out a wireless communication by a predetermined wireless communication system; and a control unit for controlling the wireless communication in said communication circuit and at the same time, for terminating the wireless connection with said communication terminal apparatus in said communication circuit when it is judged by the communication in said communication circuit that the function limitation of said communication terminal apparatus is not necessary, wherein the control unit of said communication terminal apparatus terminates the wireless connection with said wireless key apparatus in said communication circuit when it is detected that said communication terminal apparatus is in a predetermined region.

12. The wireless key apparatus according to claim 11, wherein said control unit sets the transmission output of said communication circuit in a high transmission power when it judges that the function limitation of said communication terminal apparatus is not necessary.

13. A wireless key apparatus which carries out a wireless communication with respect to a predetermined communication terminal apparatus by a predetermined wireless communication system and limits a function of a communication terminal apparatus comprising:

communication means for carrying out a wireless communication by said predetermined wireless communication system;

processing means for carrying out a wireless communication by said communication means and for executing a function independent of the function as a wireless key apparatus; and control means for controlling the wireless communication in said communication means and for terminating the wireless connection with said communication terminal apparatus in said communication means when it is judged in the communication by said communication means that the function limitation of said communication terminal apparatus is not necessary, wherein the control unit of said communication terminal apparatus terminates the wireless connection with said wireless key apparatus in said communication circuit when it is detected that said communication terminal apparatus is in a predetermined region.

* * * * *